US006465086B1

(12) United States Patent
Kitamura et al.

(10) Patent No.: US 6,465,086 B1
(45) Date of Patent: Oct. 15, 2002

(54) INK JET RECORDING MATERIAL AND PROCESS FOR PRODUCING SAME

(75) Inventors: Ryu Kitamura, Chiba (JP); Tomomi Takahashi, Tokyo (JP); Shunichiro Mukoyoshi, Ichikawa (JP)

(73) Assignee: Oji Paper Co., Ltd., Tokyo (JP)

( * ) Notice: Subject to any disclaimer, the term of this patent is extended or adjusted under 35 U.S.C. 154(b) by 0 days.

(21) Appl. No.: 09/076,888

(22) Filed: May 13, 1998

(30) Foreign Application Priority Data

| | | |
|---|---|---|
| May 15, 1997 | (JP) | 9-125613 |
| Aug. 20, 1997 | (JP) | 9-223538 |
| Nov. 17, 1997 | (JP) | 9-315129 |

(51) Int. Cl.[7] .................. B32B 5/00

(52) U.S. Cl. .................. 428/212; 156/235; 427/152; 428/195; 428/206; 428/323; 428/328; 428/331

(58) Field of Search .................. 156/235; 427/146, 427/152; 428/195, 206, 207, 212, 323, 328

(56) References Cited

FOREIGN PATENT DOCUMENTS

| | | |
|---|---|---|
| EP | 0450540 A1 | 10/1991 |
| EP | 0685344 A2 | 12/1995 |
| EP | 0759365 A1 | 2/1997 |
| JP | 62-111782 | 5/1987 |
| JP | 62-244689 | 10/1987 |
| JP | 63-104878 | 5/1988 |
| JP | 7-101142 | 4/1995 |
| JP | 7-117335 | 5/1995 |
| JP | 9-286165 | 11/1997 |
| JP | 10-86509 | 4/1998 |

*Primary Examiner*—Bruce H. Hess
(74) *Attorney, Agent, or Firm*—Arent Fox Kintner Plotkin & Kahn, PLLC

(57) ABSTRACT

An ink jet recording material having high gloss, a good ink-absorbing property, and high color density of the ink image includes at least one underrecording layer and at least one upper recording layer formed on a support and each containing fine pigment particles having an average primary particle size of 3 to 40 nm and an average secondary particle size of 10 to 400 nm, the pigment particles in the underrecording layer having a larger primary particle size than those in the upperrecording layer.

19 Claims, 1 Drawing Sheet

Fig. 1
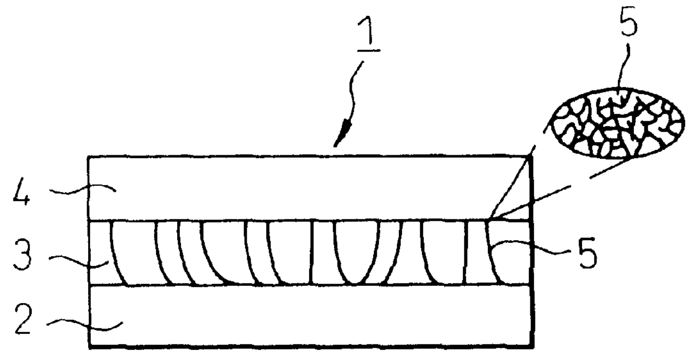
Fig. 1a
Fig. 2
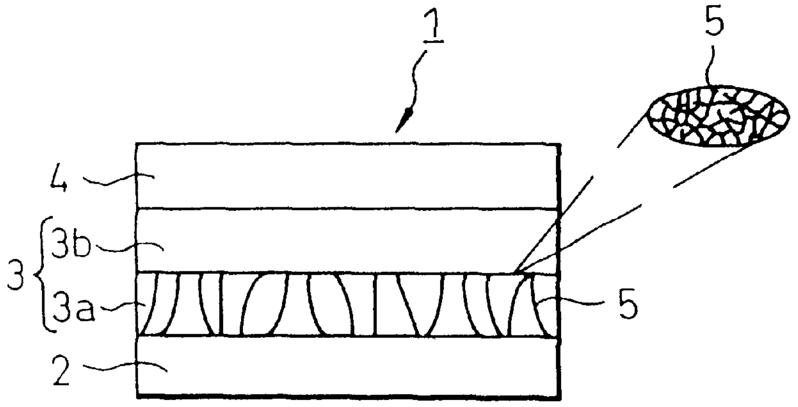
Fig. 2a

INK JET RECORDING MATERIAL AND PROCESS FOR PRODUCING SAME

BACKGROUND OF THE INVENTION

1. Field of the Invention

The present invention relates to an ink jet recording material and processes for producing the same. More particularly, the present invention relates to an ink jet recording material having excellent gloss and ink-absorption and capable of recording ink images with excellent color density, and processes for producing the same.

2. Description of the Related Art

The ink jet recording system is an ink image recording system wherein ink droplets are jetted through an ink-jetting nozzle toward a recording material at a high speed, and ink jetted droplets are absorbed in and fixed on the recording material, to form ink images. This ink jet recording system is advantageous in that full colored images can be easily formed and the printing noise is low.

The ink usable for the ink jet recording system contains a large amount of a solvent in which a coloring material is dissolved or dispersed and thus, to obtain a high color density of the recorded ink images, a large amount of the ink must be absorbed in the recording material. For the complete absorption of the ink droplets which have reached the recording material, a certain length of time is necessary. This feature of the ink jet recording system causes such a disadvantage that when the ink droplets are continuously jetted imagewise to form ink dots on the recording material surface, sometimes the ink droplets reach a target dot before an ink dot adjacent to the target dot has been completely absorbed in the recording material, and the target ink dot is connected to the adjacent ink dot so that the resultant ink image becomes unclear.

Accordingly if the recording material for the ink jet recording system is to have such an advantage that the ink dots formed thereon have high color density and brightness and a high clarity, the ink droplets must be rapidly absorbed therein and even if the ink dots are overlapped on each other, substantially no blotting of the ink may occur.

Currently, due to the rapid spread of ink jet printers, various ink jet prints with a high gloss are demanded for publications and packing paper sheets. Particularly, in colored prints, film type or coated sheet type ink jet recording sheets which have an appropriate dot form (true circle), a high dot sharpness, and high ink-receiving properties such as high ink-absorbing and fixing rates and a high ink absorption are in great demand.

To meet to the above-mentioned demands, a large number of types of ink jet recording sheets in which a coating layer containing an ink-absorbing pigment, for example, silica and alumina, and a binder is formed on a surface of a support sheet, are available. In these recording sheets, the pigments have the very small particle size of several μm, and thus the surface of the resultant recording sheet is rough and a high gloss in the resultant prints is difficult to obtain. Also, since the coating layer is quite opaque, the applied ink is easily embedded in the coating layer and thus the color density of the resultant ink images is low. Namely, the droplets of ink easily spread between the fine pigment particles over a wide area and the color density in the image decreases with an increase in the distance from the center of the image. Also, the ink-spread area becomes unnecessarily large. Therefore, the color density of the ink image becomes low as a whole and the sharpness and clearness of the image decrease. Thus, undesirable unevenness and blotting of the image occur.

To solve the above-mentioned problems, Japanese Unexamined Patent Publication No. 62-111,782 proposed an ink jet recording material in which upper and under porous coating layers, different in porosity from each other, are formed on a support sheet, to control the ink-spread and to prevent unevenness and blotting of ink images. However, since the upper and under coating layers contain pigments having a relatively large particle size, in the μm order, the resultant recording sheet was unsatisfactory in gloss and the color density of ink image.

Also, Japanese Unexamined Patent Publication No. 62-244,689 discloses an ink jet recording material in which a support is coated with an under coating layer containing a while pigment having a refraction of 1.50 or more and then with an upper coating layer containing a silicon pigment having a refraction of 1.43 to 1.48. This ink jet recording sheet can record ink images having a bright color and a high clarity. However, in this type of recording material, the pigments have a large particle size of 1 μm or more, and thus the recording material exhibits an unsatisfactory gloss and the resultant ink images have an unsatisfactory color density.

Further, Japanese Unexamined Patent Publication No. 63-104,878 discloses an ink jet recording material in which a support is coated with a two-layered recording layer. In this recording layer, the pigments contained in an upper layer and a under layer are different in particle size, and one of the upper and under coating layers contains spherical silica particles, to enhance the ink-coloring property and the dot properties, for example, the true circle form of dots. However, the ink jet recording material is still unsatisfactory in gloss and color density of ink images.

For the purpose of enhancing the gloss of ink images and the ink-absorbing property of the ink jet recording material, currently, for example, Japanese Unexamined Patent Publication No. 7-101,142 and No. 7-117,335 disclose a two layered recording layer in which an upper coating layer serves as a high gloss-exhibiting layer. In these publications, since the high gloss-exhibiting layer contains primary particles of a pigment, the porosity of the high gloss-exhibiting layer is very low. Therefore, the high gloss-exhibiting layer has very small or substantially no space for receiving and fixing the ink, and thus can serve only as an ink-passing layer. Almost all of the applied ink can be fixed only in the coating layer. The under coat layer contains pigment particles having a particle size of a μm order. Thus, the resultant under coating layer has a poor transparency, and thus cannot record ink images having a high color density. Therefore, this type of ink jet recording material substantially cannot record photographic image-like ink images having a high gloss and color density.

Further, EP-A-803374 discloses an ink jet recording material in which a support is coated with an ink receiving layer containing secondary particles having an average secondary particle size of 10 to 300 nm and consisting of primary particles having an average particle size of 3 to 40 nm and agglomerated with each other. This ink jet recording material can record photographic image-like ink images having a high gloss and a high color density. However, in the current ink jet printers, since the printing speed and ink-jetting rate are greatly increased, the blotting and unevenness of the printed ink images must be further prevented.

SUMMARY OF THE INVENTION

An object of the present invention is to provide an ink jet recording material having a high gloss, a high ink-absorbing property and a high resistance to blotting of ink and capable of recording clear ink images having excellent color density and sharpness, and processes for producing the same.

The above-mentioned object can be attained by the ink jet recording material of the present invention, which comprises a support and a multi-layered ink receiving layer comprising at least one under recording layer formed on the support and at least one upperrecording layer formed on the underrecording layer, wherein the under and upperrecording layers comprise secondary particles of a pigment having an average secondary particle size of 10 to 400 nm and each consisting essentially of a plurality of primary particles agglomerated with each other and having an average primary particle size of 3 to 40 nm, and the average primary particle size of the primary particles in the underrecording layer is larger than the average primary particle size of the primary particles in the upperrecording layer.

In a process of the present invention for producing an ink jet recording material comprising a support and a multi-layered ink receiving layer comprising at least one underrecording layer formed on the support and at least one upperrecording layer formed on the underrecording layer, the under and upperrecording layers comprising secondary particles of a pigment having an average secondary particle size of 10 to 400 nm and each consisting essentially of a plurality of primary particles agglomerated with each other and having an average primary particle size of 3 to 40 nm, and the average primary particle size of the primary particles in the underrecording layer is larger than the average primary particle size of the primary particles in the upperrecording layer, at least one first coating layer corresponding to the at least one upperrecording layer is formed on a casting surface;

separately at least one second coating layer corresponding to the at least one underrecording layer is formed on a surface of a support;

the second coating layer-coated support is laminated on the first coating layer formed on the casting surface in such a manner that the surface of the second coating layer is brought into contact with and bonded to the surface of the first coating layer; and the resultant laminate is separated from the casting surface.

In another process of the present invention for producing an ink jet recording material comprising a support and a multi-layered ink receiving layer comprising at least one underrecording layer formed on the support and at least one upperrecording layer formed on the underrecording layer, the under and upper-recording layers comprising secondary particles of a pigment having an average secondary particle size of 10 to 400 nm and each consisting essentially of a plurality of primary particles agglomerated with each other and having an average primary particle size of 3 to 40 nm, and the average primary particle size of the primary particles in the underrecording layer is larger than the average primary particle size of the primary particles in the upperrecording layer, at least one first coating layer corresponding to the at least one upperrecording layer is formed on a casting surface;

at least one second coating layer corresponding to the at least one underrecording layer is formed on the first coating layer;

a support is laminated on the first and second coating layers on the casting surface; and the resultant laminate is separated from the casting surface.

Still another process of the present invention for producing an ink jet recording material comprises:

forming at least one dried coating layer comprising a binder and secondary particles of a pigment having an average secondary particle size of 10 to 400 nm and each consisting essentially of a plurality of primary particles agglomerated with each other and having an average primary particle size of 3 to 40 nm on a casting surface;

separately forming at least one coating layer comprising a binder and secondary particles of a pigment having an average secondary particle size of 10 to 400 nm and each consisting essentially of a plurality of primary particles agglomerated with each other and having an average primary particle size of 3 to 40 nm and larger than the average primary particles size of the primary particles in the dried coating layer formed on the casting surface, on a surface of a support;

laminating, while the surface of the coating layer formed on the support is kept in a wetted condition, the coating layer-coated support on the dried coating layer formed on the casting surface, in such a manner that the wetted coating layer surface on the support is brought into contact with and bonded to the dried coating layer on the casting surface; and separating the resultant laminate from the casting surface.

BRIEF DESCRIPTION OF THE DRAWINGS

FIG. 1 shows an explanatory cross-sectional profile of an embodiment of the ink jet recording material of the present invention, and FIG. 2 shows an explanatory cross-sectional profile of another embodiment of the ink jet recording material of the present invention.

DESCRIPTION OF THE PREFERRED EMBODIMENTS

The inventors of the present invention have extensively studied an ink jet recording materials to solve the above-mentioned problems of the conventional ink jet recording material and have found that when a multi-layered ink receiving layer which comprises at least one underrecording layer and at least one upperrecording layer each containing secondary particles of a pigment, each consisting essentially of a plurality of primary particles agglomerated with each other, is formed on a support, the average secondary particles size of the secondary particles is controlled within the range of from 10 to 300 nm, the average primary particle size of the primary particles is controlled within the range of from 3 to 40 nm, and the average primary particle size of the primary particles in the underrecording layer is controlled to be larger than the average primary particle size of the primary particles in the upperrecording layer, the resultant ink jet recording material exhibits a high gloss, a high ink-absorbing property and a high resistance to blotting of ink, and can record clear ink images having a high color density. The present invention was completed on the basis of the above-mentioned finding.

When the particle size of the primary particles, from which secondary particles of a pigment having an average secondary particle size of 10 to 30 nm) are formed, is small, the resultant recording layer exhibits a high transparency and the pores formed between the particles are relatively small. Also, the specific surface area of the small particles is large, and thus the ink dye is easily fixed on the particle surfaces and a printed material having a high gloss and a high color density of printed ink images can be easily obtained. However, the small size of the primary particle causes the film-forming property of the primary particles to be low and a binder must be employed in a large amount to obtain a recording layer having a satisfactory basis weight. When the content of the binder in the recording layer is too high, the resultant recording layer exhibits a significantly decreased ink-absorbing rate and capacity. Current ink jet printers exhibit a high ink-jetting rate and capacity. Therefore, the decreased ink-absorbing rate and capacity may cause the ink droplets applied to the recording material to flow or blot to the outside of the ink dots.

To solve the above-mentioned problems, in the ink jet recording material of the present invention, the ink receiving layer is formed in a two or more layered form and the average particle size of the primary particles in the underrecording layer is controlled to be larger than that in the upperrecording layer.

When the size of the primary particles, from which the secondary particles in the upper recording layer are formed, is small, the resultant ink receiving layer exhibits a high gloss and is capable of recording ink images having a high color density. When the size of the primary particles, from which the primary particles in the underrecording layer are formed, is large, the underrecording layer exhibits an enhanced film-forming property and can be formed in a large basis weight. Also, it becomes possible to control the ink absorbing rate of the underrecording layer to be higher than that of the upperrecording layer. In this case, an ink jet recording material having a high ink-absorbing capacity and a significantly high resistance to blotting of the ink, is obtained.

In the ink jet recording material, when a cationic compound is contained in the ink receiving layer, an anionic dye of the ink can be easily fixed in the ink receiving layer, and the resultant prints exhibit a significantly enhanced water resistance and durability in storage.

Further, when at least the upperrecording layer is formed on a casting surface and then transferred to a support or an underrecording layer formed on the support, the resultant ink jet recording material has a photographic paper-like high gloss.

The ink jet recording material of the present invention comprises a support and a multi-layered ink-receiving layer comprising at least one underrecording layer formed on the support and at least one upperrecording layer formed on the underrecording layer, wherein, the under and upperrecording layers comprise secondary particles of a pigment having an average secondary particle size of 10 to 300 nm and each consisting essentially of a plurality of primary particles agglomerated with each other and having an average primary particle size of 3 to 40 nm, and the average primary particle size of the primary particles contained in the underrecording layer is larger than the average primary particle size of the primary particles contained in the upperrecording layer.

In the ink jet recording material of the present invention, the average primary particle size of the primary particles contained in the underrecording layer may be 1.2 to 10 times the average primary particle size of the primary particles contained in the upperrecording layer.

In the ink jet recording material of the present invention, the upperrecording layer optionally further comprises a cationic compound.

In the ink jet recording material of the present invention, the ink-receiving layer optionally further comprises an additional recording layer comprising, as a principal component, a polymeric material. The additional layer is arranged between the support and the underrecording layer.

In the ink jet recording material of the present invention, the upperrecording layer may be one provided in such a manner that a coating layer corresponding to the upperrecording layer is formed on a casting surface, a underrecording layer formed on a support is superposed on and bonded to the coating layer located on the casting surface, and the resultant laminate is separated from the casting surface.

In the ink jet recording material of the present invention, the upperrecording layer may be one provided in such a manner that a first coating layer corresponding to the upperrecording layer is formed on a casting surface, a second coating layer corresponding to the under recording layer is formed on the first coating layer, a support is superposed on and bonded to the second coating layer, and the resultant laminate is separated from the casting surface.

In the process for producing an ink jet recording material comprising a support and a multi-layered ink receiving layer comprising at least one underrecording layer formed on the support and at least one upperrecording layer formed on the underrecording layer, the under and upper-recording layers comprising secondary particles of a pigment having an average secondary particle size of 10 to 400 nm and each consisting essentially of a plurality of primary particles agglomerated with each other and having an average primary particle size of 3 to 40 nm, and the average primary particle size of the primary particles contained in the under recording layer is larger than the average primary particle size of the primary particles contained in the upperrecording layer, at least one first coating layer corresponding to the at least one upperrecording layer is formed on a casting surface; separately at least one second coating layer corresponding to the at least one underrecording layer is formed on a surface of a support;

the second coating layer-coated support is laminated on the first coating layer formed on the casting surface in such a manner that the surface of the second coating layer is brought into contact with and bonded to the surface of the first coating layer; and the resultant laminate is separated from the casting surface.

In another process for producing an ink jet recording material comprising a support and a multi-layered ink receiving layer comprising at least one underrecording layer formed on the support and at least one upperrecording layer formed on the underrecording layer, the under and upperrecording layers comprising secondary particles of a pigment having an average secondary particle size of 10 to 400 nm and each consisting essentially of a plurality of primary particles agglomerated with each other and having an average primary particle size of 3 to 40 nm, and the average primary particle size of the primary particles contained in the underrecording layer is larger than the average primary particle size of the primary particles contained in the upperrecording layer, at least one first coating layer corresponding to the at least one upperrecording layer is formed on a casting surface; at least one second coating layer corresponding to the at least one underrecording layer is formed on the first coating layer; a support is laminated on the first and second coating layers formed on the casting surface; and the resultant laminate is separated from the casting surface.

Still another process for producing an ink jet recording material comprises;

forming at least one dried coating layer containing a binder and secondary particles of a pigment having an average secondary particle size of 10 to 400 nm and each consisting essentially of a plurality of primary particles agglomerated with each other and having an average primary particle size of 3 to 40 nm, on a casting surface;

separately forming at least one coating layer containing a binder and secondary particles of a pigment having an average secondary particle size of 10 to 400 nm and each consisting essentially of a plurality of primary particles agglomerated with each other and having an average primary particle size of 3 to 40 nm and larger than the average primary particle size of the primary particles contained in the dried coating layer located on the casting surface, on a surface of a support;

laminating, while the surface of the coating layer formed on the support is kept in a wetted condition, the coating layer-coated support on the dried coating layer formed on the casting surface in such a manner that the wetted coating layer surface on the support is brought into contact with and bonded to the dried coating layer on the casting surface;

and separating the resultant laminate from the casting surface.

In the ink jet recording material of the present invention, the pigment preferable comprise at least one member selected from the group consisting of amorphous silica and alumina silicate.

In the ink jet recording material of the present invention, the pigment preferably comprise amorphous silica.

In the ink jet recording material of the present invention, at least one recording layer other than an uppermost recording layer of the ink-receiving layer may have cracks formed to an extent such that when an ink jet dot printing is applied to the crack-formed recording layer, and printed ink dots having a diameter of 50 $\mu$m are observed through an optical microscope at a magnification of 150, a crack proportion, which is represented by a ratio in % of the number of printed dots in which cracks are formed to the total number of the printed dots, is 30% or more.

In the ink jet recording material of the present invention, the uppermost recording layer may have a crack proportion smaller than that of the other recording layers.

In the ink jet recording material of the present invention, the uppermost recording layer may have a pore volume of 0.2 to 3.0 ml/g.

In the ink jet recording material of the present invention, at least the uppermost recording layer may be one formed on a casting surface, integrated with the remaining recording layers of which at least one layer has the cracks and the support, and then separated from the casting surface.

The ink jet recording material of the present invention may be produced by a procedure in which at least one recording layer other than the uppermost recording layer is formed on a surface of a support and dried; during the formation of the other recording layer, at least one surface of the at least one other recording layer is wetted with water or a solvent; and then the uppermost recording layer is coated on the at least one other recording layer and dried.

In the ink jet recording material of the present invention, the ink receiving layer formed on a support has at least one underrecording layer formed on the support and at least one upperrecording layer formed on the underrecording layer. The under and upper-recording layers contain secondary particles of a pigment having an average secondary particle size of 10 to 400 nm and each constituted from a plurality of primary particles having an average primary particle size of 3 to 40 nm, the average primary particle size of the primary particles in the underrecording layer being larger than that in the upperrecording layer.

The above-mentioned type of the ink jet recording material of the present invention has a high gloss, exhibits an excellent ink-absorbing property and can record ink images with a high color density.

In the ink jet recording material of the present invention, there is no limitation to the type, form and size of the support. The support may be transparent or opaque. For example, the support can be formed from at least one member selected from cellulose films, plastic film, for example polyethylene, polypropylene, soft polyvinyl chloride, hard polyvinyl chloride and polyester films, paper sheets, for example, woodfree paper sheets, neutral paper sheets, photographic paper support sheets, art paper sheets, coated paper sheets, cast-coated paper sheets, metallic foil-laminated paper sheets, kraft paper sheets, polyethylene-laminated paper sheets, impregnated paper sheets, metallized paper sheets and water-soluble paper sheets, metal foils and synthetic paper sheets.

The multi-layered ink receiving layer of the present invention will be explained in detail below.

The ink receiving layer comprises at least one underrecording layer and at least one upperrecording layer. Each recording layer comprises a binder and a pigment.

The pigment comprises at least one member selected from, for example, amorphous silica, cation-modified silica such as alumina-modified silica, alumina silicate, kaolin, clay, calcined clay, zinc oxide, tin oxides, magnesium sulfate, aluminum oxide, aluminum hydroxide, alumina, pseudo-bochmite, calcium carbonate, satin white, aluminum silicate, smectite, zeolite, magnesium silicate, magnesium carbonate, magnesium oxide, diatomaceous earth, styrene resin plastic pigments, urea resin plastic pigments and benzoguanamine resin plastic pigment, which are commonly known and widely used in practice. However, to obtain the ink jet recording material of the present invention having high gloss and ink-absorbing property and capable of recording ink images having a high color density, the pigment secondary particles having an average secondary particle size of 10 to 400 nm and constituted from a plurality of primary particles having an average primary particle size of 3 to 40 nm must be used. To obtain the secondary particle of a pigment having an average secondary particle size of 10 to 400 nm, trade pigment particle having a particle size in $\mu$m order are subjected to a high mechanical force, namely, a cracking down method or a breaking down method is applied to the pigment particles. The cracking down method is utilized to finely pulverize a lump-shaped material. The mechanical means include ultrasonic homogenizers, pressure-type homogenizers, nanomizers, high speed revolution mills, roller mills, container-drived medium mills, medium-stirring mills, jet mills, mortars, and sand grinders. The fine particles of the pigment usable for the present invention may be colloidal particles and in the state of a slurry. To attain the effect of the present invention as much as possible, the pigment is preferably selected from silica, alumina silicate, alumina (including pseudo-boehmite) and calcium carbonate pigments, more preferably amorphous silica and alumina silicate. Particularly, the amorphous silica is preferred. Unless specifically mentioned, the average particle size used in the present invention is a particle diameter (Martin size) determined by using an electron microscope (both SEM and TEM) (Asakura Shoten, "Fine Particle Handbook" page 52).

In the upperrecording layer, the primary particles from which the secondary particles are formed have an average particle size of 3 to 40 nm, preferably 3 to 25 nm, more preferably 5 to 20 nm. When the average particle size of the primary particles is small, the gaps formed between the primary particles are small, and the absorbing capacity of the recording layer for solvent or water in the ink is significantly small. Also, when the particle size of the primary particles is large, the resultant secondary particles formed from the primary particles agglomerated with each other are large, the resultant recording layer exhibits a reduced transparency and thus there is a risk that the ink images having a high color density cannot be formed.

The average particle size of the primary particles from which the secondary particles for the underrecording layer are formed is larger than the average particle size of the upperrecording layer. Preferably, the average primary particle size in the underrecording layer is 1.2 to 10 times, more preferably 1.5 to 5 times, that in the upperrecording layer.

When the average primary particle size in the underrecording layer is too close to the average primary article size in the upperrecording layer, the color density of the ink images and the ink-absorbing property of the ink-receiving layer are difficult to balance. When the average particle size of the primary particles in the underrecording layer is too large, the resultant underrecording layer exhibits a low mechanical strength and is not preferred.

In the present invention, there is no limitation to the average particle size of the secondary particles in the underrecording layer. Preferably, the average particle size of the secondary particles in the underrecording layer is larger than the average particle size of the secondary particles in the upperrecording layer. In the present invention, the particles size of the secondary particles in the under-and upper-recording layers is in the range of from 10 to 400 nm, preferably 10 to 300 nm, more preferably 15 to 200 nm, still more preferably 20 to 150 nm. When the particle size of the secondary particles is too small, the ink-absorption rate of the resultant recording layer is low. Also, when the average particle size of the secondary particles is too large, the resultant recording layer surface is rough and exhibits a low gloss.

The alumina silicate particles mentioned above are composite particles synthesized by a hydrolysis method using, as principal components, an aluminum alkoxide and a silicon alkoxide. In the resultant alumina silicate particles, an alumina component and a silica components are contained in such a condition that the components cannot be individually collected from each other.

Conventional pigments which are commonly known and widely used in the general coated paper sheet field, and have a particle size of an μm order, can be employed together with the specific pigment particles of the present invention, to increase the ink-absorbing property, unless the gloss and color density of the ink images are decreased.

The under- and upper-recording layers of the present invention usually contain a binder. The binder comprises at least one member selected from, for example, water-soluble polymeric material, for example, polyvinyl alcohol which will be referred to as PVA hereinafter, modified polyvinyl alcohols such as silyl-modified polyvinyl alcohols, cation-modified polyvinyl alcohols, casein, soybean protein, synthetic proteins, starch, and cellulose derivatives such as carboxymethyl cellulose and methylcellulose; and water-dispersible or emulsionizable polymeric materials, for example, conjugated diene polymer latices such as styrene-butadiene copolymer and methyl methacrylate-butadiene copolymer latices, acrylic polymer latices, and vinyl copolymer latices such as styrene-vinyl acetate copolymer latices, and acrylic polymer latices, which are usually used for the conventional coated paper sheets. The binder materials as mentioned above may be employed alone or in a mixture of two or more thereof. To enhance the adhesion between the support and the ink-receiving layer or between the recording layers, the water-soluble polymeric materials are preferably employed. Particularly, when a polyvinyl alcohol having a degree of polymerization of 2000 or more is employed, the adhesion between the ink receiving layer and the support is high, and thus the resultant ink jet recording material exhibits a high gloss, a high ink absorbing property and a high water resistance and can record ink images having a high color density.

In each of the under-and upper-recording layers, a solid weight ratio of the pigment to the binder is controlled preferably to a level of 100/5 to 100/200, more preferably 100/10 to 100/100. When the proportion of the binder is too high, the pores formed between the pigment particles may be small, and the ink-absorbing rate of the resultant recording layer may be low. Also, when the proportion of the binder is too low, the resultant recording layer may be easily cracked and may exhibit a low gloss.

In the present invention, when the solid weight ratio of the pigment to the binder in the upperrecording layer is controlled between 100/10 and 100/60, small cracks having a length of 0.02 mm or less are formed in the resultant upperrecording layer. The small cracks contribute to enhancing the ink-absorbing rate of the layer and substantially do not cause the gloss of the layer to decrease. Thus the resultant ink jet recording material exhibits a high gloss and a very high ink-absorbing rate and can record ink images having a high color density.

In the ink jet recording material of the present invention, the ink-receiving layer optionally contains a cationic resin which contributes to enhancing the ink-fixing property of the ink-receiving layer.

Particularly, the cationic resin is preferably contained in the upperrecording layer. The cationic resin is preferably selected from polyalkylenepolyamines, for example, polyethylenepolyamine and polypropylenepolyamine, and derivatives thereof, acrylic resins having tert-amino groups and/or quatanary ammonium groups; and diacrylamino compounds which are known compounds and are available as trade chemicals.

In the ink-receiving layer, the cationic resin is preferable contained in an amount of 1 to 30 parts by weight, more preferably 5 to 20 parts by weight, per 100 parts by weight of the pigment. The cationic resin may be mixed into the fine pigment particle dispersion produced, for example, by the breaking down method. When the fine pigment particles are anionic, the mixing of the cationic resin with the anionic fine pigment particles results in an agglomeration of the fine pigment particles. Therefore, the mixing of the cationic resin with the anionic pigment particles is preferably carried out in such a manner in that fine pigment particles having a particle size in a μm order is mixed with a cationic resin, and the resultant mixture is dispersed and further mechanically pulverized and dispersed.

Otherwise, secondary particles of a pigment prepared by a disperse-pulverizing procedure and having a secondary particle size of 10 to 400 nm are mixed with a cationic resin, to provide a coagulated mixture having an increased viscosity, and the coagulated mixture is mechanically pulverized and dispersed. Also, the ink-receiving layer optionally contains a conventional additive comprising at least one member selected from dispersants, thickening agents, defoaming agents, coloring materials, antistatics and preservatives.

There are no limitations to the amounts of the upperrecording layer and the underrecording layer. Preferably, the amount of the upperrecording layer is controlled to 1 to 50 $g/m^2$, more preferably 2 to 20 $g/m^2$. Also, the amount of the underrecording layer is preferably controlled to 2 to 80 $g/m^2$, more preferably 5 to 70 $g/m^2$. When the amount of the upper- or under-recording layer is small, the layer may be difficult to form uniformly. Also, when the layer amount is large, the resultant layer may have large cracks.

To increase the ink-absorbing capacity, for example, the upperrecording layer may be formed in two or more layers. Also, the ink receiving layer may have an additional recording layer comprising, as a principal component, an ink-absorbing resin, and may be located between the support and the underrecording layer.

The ink-absorbable resin may comprise at least one member selected from, for example, polyalkyleneoxides, PVA, modified polyvinyl alcohols, cellulosic derivatives, casein, gelatin, and polyvinyl pyrrolidone. Among these resins, cross-linked thermoplastic polyalkyleneoxide resins are preferably utilized. Compared with other resins, the thermoplastic polyalkyleneoxide resins are advantageous in high processability, high ink absorbing capacity, and high sharpness of resultant ink images.

Particularly, the cross-linked polyalkyleneoxide resin is advantageously mixed with a polyamide resin. In this mixture, a high ink-absorbing performance derived from the cross-linked polyalkyleneoxide resin and high heat resistance and water resistance derived from the polyamide resin are not lost and a synergistic effect can be attained.

In an embodiment of the process of the ink jet recording material of the present invention, at least the upperrecording layer, namely the upperrecording layer alone or both the upper- and under-recording layers, are formed on a casting surface, and are transferred onto the underrecording layer formed on a support or onto the support (when the underrecording layer is formed on the upperrecording layer on the casting layer), and the resultant laminate is separated from the casting surface. In this process, the resultant upperrecording layer surface has a high gloss.

The casting surface can be selected from high smoothness surfaces of polymeric films, for example, regenerated cellulosic films, polyethylene films, polypropylene films, soft polyvinyl chloride films, hard polyvinyl chloride films, and polyester films surface-smoothed paper sheets, for example, polyethylene laminated paper sheets, glassine paper sheets, impregnated paper sheets, and metallized paper sheets, metal foils, and thermoplastic sheets, for example, synthetic paper sheets, inorganic glass plates and surface-smoothed metallic and plastic drums and plates. In consideration of ease in production and in separation of the resultant recording layer from the casting surface, a polymer film, for example, a polyethylene, polypropylene or polyester film, or a metallic drum having a high surface smoothness is used as a casting surface.

For the purpose of imparting a high gloss to the upperrecording layer, the casting surface preferably has a high smoothness. Namely, the surface roughness Ra of the casting surface is preferably 0.5 $\mu$m or less, more preferably 0.05 $\mu$m or less, determined in accordance with JIS B 0601. Also, the surface of the upperrecording layer may be semi-gloss or mat. The gloss or mat surface of the upperrecording layer can be obtained by controlling the surface roughness Ra of the casting surface.

The casting surface may be a non-treated one. However, to control the bonding strength between the casting surface and the upperrecording layer to a level lower than the bonding strength between the support and the ink-receiving layer, the casting surface may be coated with a releasing agent, for example, a silicone or a fluorine-containing resin.

The bonding method between the upperrecording layer formed on the casting surface and the underrecording layer formed on the support, or between the underrecording layer formed on the upperrecording layer formed on the casting surface and the support is not limited to a specific method as long as they are firmly bonded to each other. The bonding method can be selected from direct bonding method in which they are directly press-bonded to each other under pressure, and indirect bonding method in which the surface of the support or of the underrecording layer formed on the support is coated with an intermediate layer (including an adhesive layer, a adhesive recording layer or a tacky or adhesive ink-absorbable resin layer), and then laminated to the coating layer formed on the casting surface through the intermediate layer. Otherwise, the intermediate layer is coated on the coating layer formed on the casting layer and then, the support or the underrecording layer-coated support is laminated to the coating layer on the casting surface through the intermediate layer. After the lamination is completed, the resultant laminate is separated from the casting surface.

The recording layers and intermediate layer can be formed by using conventional coating means, for example, a die coater, blade coater, air knife coater, roll coater, bar coater, gravure coater, rodblade coater, lip coater, or curtain coater.

The ink usable for the ink jet recording material of the present invention comprises, as indispensable components, a coloring material for forming colored images and a liquid medium for dissolving or dispersing the coloring material, and as optional components, a dispersant, surfactant, viscosity modifier, specific resistance-modifier, pH-adjuster, mildewcide, and a solution or a dispersion-stabilizer for a recording agent.

The recording agent for the ink comprises at least one member selected from direct dyes, acid dyes, basic dyes, reactive dyes, food coloring matters, disperse dyes, oil dyes and pigments. Conventional recording agents can be used for the ink without any restriction. The content of the coloring material in the ink is established in response to the type of the liquid medium and the properties required to the coloring material. In the ink usable for the ink jet recording material of the present invention, the content of the coloring material is about 0.1 to 20% by weight which is quite usual for conventional inks.

In a preferred embodiment of the present invention, an ink jet recording material having a high surface smoothness and gloss, and a high ink-absorbing capacity and capable of recording ink images having a high color density and grade and a process for producing the same are provided.

Generally, a dispersion containing particles having a particle size of 300 nm or more causes a resultant recording layers formed therefrom to exhibit an unsatisfactory transparency and a poor surface smoothness and thus is not suitable for producing an ink jet recording material having a high gloss and capable of recording ink images with a high color density.

When the upperrecording layer is formed on a casting surface, there are no specifically severe limitations to the viscosity and particle concentration of the coating liquid for the upperrecording layer. The upperrecording layer having a high surface smoothness and gloss can be obtained by forming it from a coating liquid containing a binder and secondary particles of a pigment having an average secondary particle size of 10 to 400 nm, preferably 10 to 300 nm, and each consisting essentially a plurality of primary particles having an average particle size of 3 to 40 nm. When the casting surface has a high smoothness, a high smoothness of the upperrecording layer surface can be obtained. Also, when the secondary pigment particles having an average secondary particle size of 10 to 400 nm are used, the resultant upperrecording layer exhibit a high transparency and can record ink images having a high color density.

Also, when the upperrecording layer is bonded to the underrecording layer by a wet laminating method, no bubble or pore is formed in the surface portion of the upperrecording layer. Further, when the upperrecording layer is bonded, after drying, to the underrecording layer, there is no risk of mixing the coating liquid for the upperrecording layer with the coating liquid for the underrecording layer. By increasing the total amount of the ink receiving layer, the ink-absorbing capacity of the resultant ink jet recording material can be increased. The above-mentioned capability was confirmed.

The present invention includes the following embodiments but not is limited to the embodiments.

[1] A process for producing an ink jet recording material having at least two recording layers, in which a support (or when the support has a recording layer formed on the support, the recording layer) is coated with an underrecording layer, and, while the underrecording layer is kept in a wetted condition; the wetted underrecording layer is laminated to a dried upperrecording layer comprising at least one layer formed on a casting surface and containing a binder and secondary pigment particles having an average secondary particle size of 10 to 400 nm and each consisting essentially of a plurality of primary particles having an average primary particle size of 3 to 40 nm, by a wet laminating method; and then the resultant laminate is separated from the casting surface.

[2] In the ink jet recording material of the present invention, preferably, the underrecording layer comprises at least a pigment and a binder, the pigment comprising secondary particles having an average secondary particle size of 10 to 400 nm, preferably 10 to 300 nm, and each consisting essentially of a plurality of primary particles having an average primary particle size of 3 to 40 nm.

[3] In the ink jet recording material of the present invention, preferably, the pigment particles comprise at least one member selected from amorphous silica and alumina silicate.

In the embodiment of the ink jet recording material of the present invention, the support is preferably formed from at least one member selected from moisture-permeable (air-permeable) sheets, for example, air-permeable polymer films, synthetic paper sheets and paper sheets. The moisture-permeable paper sheets are preferred. For example, woodfree paper sheets, neutral paper sheets, acidic paper sheets, support sheets for photographic sheets, art paper sheets, coated paper sheets, cast-coated paper sheets, kraft paper sheets, and impregnated paper sheets are preferably used for the support. Particularly, in view of the surface smoothness and gloss, woodfree paper sheets, support sheets for photographic sheets, art paper sheets, coated paper sheets and cast-coated paper sheets which have a high surface smoothness are more preferably employed for the support.

The pigment to be contained in each recording layer comprises, for example, amorphous silia (including cation-modified silica, for example, alumina-modified silica), kaolin, clay, calcined clay, zinc oxide, tin oxides, magnesium sulfates, aluminum oxide, aluminum hydroxide, alumina, pseudo-boehmite, calcium carbonate, satin white, aluminum silicate, smectites, zeolites, magnesium silicate, magnesium carbonate, magnesium oxide, diatomaceous earth, styrene polymer plastic pigments, urea resin plastic pigments and benzoguanamine resin plastic pigments which are widely used in the conventional coated paper sheet field.

In the upperrecording layer, fine pigment particles having, an average secondary particle size of 10 to 400 nm, preferably 10 to 300 nm and an average primary particle size of 3 to 40 nm. When the average secondary particle size is in the range of from 10 to 400 nm, the resultant upperrecording layer exhibits a high surface smoothness and can record ink images having a high sharpness and clarity. More preferably, the average primary particle size is 5 to 30 nm and the average secondary particle size is 20 to 200 nm.

The fine pigment particles having an average secondary particle size of 10 to 400 nm can be produced by pulverizing and dispersing a pigment material by mechanical means, for example, a breaking down method in which a lump-formed pigment material is finely divided. The mechanical means include an ultrasonic homogenizer, high speed revolution mill, sand grinder and pressure-applying homogenizer.

The lower limits of the average secondary particle size is 10 nm, preferably 20 nm. Also, when the average primary particle size is in the range of from 3 to 40 nm, the resultant upperrecording layer exhibits an excellent ink-absorbing property.

Particularly, the pigment is preferably selected from amorphous silica (including cation-modified silica, for example, alumina-modified silica) and alumina silicate.

In the formation of each recording layer, a binder is used to adhere the fine pigment particles to each other and to the support.

The binder preferably comprises at least one member selected from, for example, water-soluble resins, for example, polyvinyl alchol (PVA)), casein, soybean protein, synthetic proteins, starch, cellulose derivatives, for example, carboxymethyl cellulose and methylcellulose, conjugated diene polymer latices, for example, styrene-butadiene copolymer and methyl methacrylate-butadiene copolymer latices, acrylic polymer latices and vinyl polymer latices, for example, styrene-vinyl acetate copolymer latices, which are widely employed for the coated paper sheet production and can be used alone in a mixture of two or more thereof.

To enhance the bonding strength between the underrecording layer and the upperrecording layer formed on a casting surface, the surface smoothness, the ink-absorbing property, the color density of printed ink images, and the water resistance, the binder is preferably selected from water-soluble resins, for example, PVA.

There is no specific limitation to the solid weight ratio of the pigment to the binder in each recording layer. Preferably, the solid weight ratio (pigment/binder) is in the range of from 100/5 to 100/200, more preferably 100/10 to 100/100. When the proportion of the binder is too high, the volumes of the pores formed between the pigment particles may be small and the ink-absorbing rate may be small. When the proportion of the binder is too low, the resultant recording layer may exhibit a low resistance to cracking.

Each recording layer optionally comprises a cationic resin for the purpose of enhancing the ink-fixing property of the layer. The cationic resin can be selected from those mentioned above. The content of the cationic resin is not limited to a specific level. Usually, the cationic resin is present in an amount of 1 to 30 parts by weight, preferably 5 to 20 parts by weight, per 100 parts by weight of the pigment, in each recording layer. The recording layers optionally contain at least one additive selected from, for example, disperses, viscosity-modifiers, anti-foaming agents, coloring materials, antistatics, and preservatives.

There is no specific limitation to the amounts of the recording layers. The amounts of the recording layers are preferably 1 to 100 $g/m^2$, more preferably 2 to 50 $g/m^2$. When the amount of the upperrecording layer is less than 1 g/m, the resultant gloss and smoothness may be unsatisfactory. When the amount of the upperrecording layer is more than 100 $g/m^2$, the resultant layer may exhibit an unsatisfactory resistance to cracking. When the amount of the underrecording layer is less than 1 $g/m^2$, the resultant underrecording layer may be difficult to serve as a bonding layer between the support and the upperrecording layer and thus cannot firmly bond the support to the upperrecording layer by the wet lamination method. Also, when the amount of the underrecording layer is more than 100 $g/m^2$, the bonding procedure between the underrecording layer and the upperrecording layer under pressure may be difficult to carry out smoothly.

In this embodiment of the process of the present invention, a wet lamination method is utilized. The wet lamination method is a conventional method for laminating, for example, a paper sheet to a paper sheet or to an aluminum foil or to a regenerated cellulose film. In this embodiment, an aqueous solution of a water-soluble binder, which may be a coating liquid for forming a recording layer, is coated on a support surface (or a surface of a recording layer formed on the support) by a conventional coating procedure, and, while the coated binder is in a wetted condition, the binder-coated support is laminated to another recording layer, and then the laminate is passed through a pair of rolls under pressure and then dried to remove water from the binder solution. By these procedures, a support or a recording layer-coated support is bonded to another recording layer.

The underrecording layer in the wetted condition preferably contains water in an amount of 350 parts by weight or more, more preferably 500 parts by weight or more, per 100 parts by weight of the total solid of the underrecording layer.

In the process of the present invention, the lamination by the wet lamination method is carried out, for example, by bringing an underrecording layer formed on a support into contact with an upperrecording layer formed on a casting surface, and the resultant laminate is pressed with a pressing roll under nipping pressure to bond the underrecording layer to the upper-recording layer. The nipping linear pressure is preferably controlled to 1 to 200 kg/cm, more preferably 3 to 70 kg/cm. More preferably, the nipping linear pressure is controlled to 5 to 30 kg/cm in consideration of the relationship between the coating amount and the surface gloss and smoothness.

In the this embodiment, an excellent gloss and smoothness can be obtained by forming an upperrecording layer comprising at least one layer containing a binder and pigment particles having an average primary particle size of 3 to 40 nm and an average secondary particle size of 10 to 400 nm on a casting surface; transferring and bonding the resultant upperrecording layer to a support or a recording layer formed on the support coated with an underrecording layer, while the underrecording layer is in a wetted condition, by a wet lamination method; then drying the resultant laminate; and separating the dried laminate from the casting surface. In this case, in consideration of the drying property of the laminate, at least one of the casting surface and the support is preferably formed from a moisture-permeable material.

The wetted coating layer can be formed by a method other than the above-mentioned method in which the wetted coating layer is formed on the support. In the other method, the wetted coating layer is formed on a recording layer (upperrecording layer) formed and dried on a casting surface, a support is superposed and bonded to the wetted coating layer, and he resultant laminate is separated from the casting surface.

The casting surface is preferably formed from plastic polymeric films, for example, regenerated cellulose, polyurethane, polyethylene, polypropylene, soft polyvinyl chloride, hard polyvinyl chloride, and polyester films; paper sheets, for example, polyethylene-laminated paper sheets, glassine paper sheets, impregnated paper sheets and metallized paper sheets; metallic foils and synthetic paper sheets; and glass articles, drums and plates having a high surface smoothness and made from an inorganic glass, a metal or a plastic resin. To obtain a further enhanced gloss and smoothness, preferably, the casting surface is formed from plastic polymeric films, for example, regenerated cellulose, polyethylene, polypropylene, soft polyvinyl chloride, hard polyvinyl chloride, and polyester films; and drums and plates made from an inorganic glass, metal or plastic resin and having a high surface smoothness. Particularly, in consideration of the production process and the releasing property between the casting surface and the recording layer, a polymeric film (for example, polyethylene, polypropylene, or polyester film) or a metallic drum having a high smoothness periphery surface is used for the casting surface.

To provide the high gloss and smoothness to the upperrecording layer surface, the casting surface preferably has a high smoothness. The casting surface preferably a surface roughness Ra of 0.5 $\mu$m or less, more preferably 0.05 $\mu$m or less, determined in accordance with JIS B 0601. However, the casting surface may be a semi-gloss surface or mat-like surface formed by controlling the surface roughness.

The casting surface may be not surface-treated.

Alternatively, to control the bonding strength between the casting surface and the upperrecording layer to lower than the bonding strength between the upperrecording layer and the underrecording layer or between the underrecording layer and the support which may have a coating layer, the casting surface may be coated with a compound having a releasing property, for example, a silicon or fluorine-containing resin.

The recording layer may be formed by a conventional coater, for example, blade, air knife, roll, bar, gravule, rodblade, lip, die or curtain coater.

In another embodiment of the present invention, an ink jet recording material having a high ink-absorbing rate, a high ink-absorbing capacity and a high gloss and capable of recording ink images having a high color density can be obtained.

In this embodiment, the target ink jet recording material of the present invention has an ink receiving layer comprising two or more recording layers wherein at least one recording layer other than an uppermost recording layer which is located farthest from the support has cracks. The cracks contribute to enhancing the gloss, ink-absorbing rate and capacity and the color density of the ink images.

When the cracks are present in the at least one recording layer other than the uppermost recording layer, not only the ink-absorbing rate of the underrecording layer increases, but also the ink-absorbing capacity of the underrecording layer greatly increases and thus an undesired ink absorption of the support can be prevented. Also, the printed recording material is quite free from a corrugated and roughened surface and thus the resultant prints have a high quality. The cracks present in the underrecording layer cause the upperrecording layer to exhibit an increased ink-absorbing rate, the quality of ink images to be improved, and the ink jet printing can be effected without blotting with the ink.

In a preferred embodiment of the ink jet recording material of the present invention, the underrecording layer has cracks and the upperrecording layer is quite free from the cracks. When the cracks are present in the underrecording layer, even when the upperrecording layer has no cracks, the resultant ink-receiving layer exhibit a high ink-absorbing rate, and dyes contained in the ink and having a relatively high molecular weight are fixed in the upperrecording layer and the others such as a solvent and water contained in the ink and having a relatively low molecular weight are received in the underrecording layer. Accordingly, even when the amount of the ink-receiving layer is relatively small, the ink-receiving layer can exhibit a high ink-absorbing rate and capacity. Further, since the upperrecording layer has no cracks, the printed ink dots have a true circular form and thus the resultant ink images have a high accuracy and sharpness.

Before the present invention, it was impossible to prepare an ink-receiving layer comprising an underrecording layer having cracks and an upperrecording layer having no cracks or cracks in a smaller number than the number of the cracks in the underrecording layer. However, in the present invention, as a result of extensive study of the inventors of the present invention, it was found that an ink-receiving layer having an underrecording layer having cracks could be produced by, for example, forming an underrecording layer on a surface of a support, creating cracks in the underrecording layer, filling the cracks with a solvent or water, and then coating an upperrecording layer on the underrecording layer, and removing the solvent or water from the resultant ink-receiving layer by drying. In the resultant ink-receiving layer, the cracks formed in the underrecording layer are retained. Also, by forming an upperrecording layer (which may be coated with an additional recording layer for increasing the ink-absorbing capacity) on a casting surface, drying the coated layer, separately forming an underrecording layer on a support and creating cracks in the underrecording layer, and then laminating and bonding the underrecording layer to the upperrecording layer, and separating the resultant laminate from the casting surface, an ink jet recording material having a photographic sheet-like high gloss can be produced.

In the ink jet recording material of the present invention, since the under and upper-recording layers contain very fine pigment secondary particles having an average secondary particle size of 10 to 400 nm, preferably 10 to 300 nm, and consisting essentially of primary particles having an average primary particle size of 4 to 40 nm and agglomerated with each other, the ink-receiving layer exhibits a high gloss and can record ink images with a high color density.

When a cationic resin is contained in the upperrecording layer, anionic dyes can be easily fixed in the upperrecording layer and the resultant ink images exhibit an enhanced water resistance and durability in storage.

The present invention includes the embodiments as shown below, but is not limited to the shown embodiments.

An embodiment of the ink jet recording material of the present invention comprises at least one recording layer other than an uppermost recording layer of the ink receiving layer which has cracks formed to an extent such that when an ink jet dot printing is applied to the crack-formed recording layer, and the printed ink dots having a diameter of 50 μm are observed through an optical microscope at a magnification of 150, a crack proportion which is represented by a ratio in % of the number of the printed dots in which cracks are formed to the total number of the printed dots, is 30% or more.

In the above-mentioned ink jet recording material, the crack-formed recording layer preferably has at least one crack per 200 μm-squared area.

In the above-mentioned ink jet recording material, the uppermost recording layer may have cracks and the crack proportion in % of the uppermost recording layer may be lower than that of the other recording layer.

In the above-mentioned ink jet recording material, the uppermost recording layer may have no cracks.

In the above-mentioned ink jet recording material, the at least one recording layer may comprise very fine pigment secondary particles having an average secondary particle size of 10 to 400 nm, preferably 10 to 300 nm, and consisting essentially of a plurality of primary particles having an average primary particle size of 3 to 40 nm and agglomerated with each other.

In the above-mentioned ink jet recording material, all of the recording layers may contain very fine pigment secondary particles having an average secondary particle size of 10 to 400 nm, preferably 10 to 300 nm, and consisting essentially of a plurality of primary particles having an average primary particle size of 3 to 40 nm and agglomerated with each other.

In the above-mentioned ink jet recording material, the very fine pigment secondary particles may comprise at least one member selected from silica sols, alumina silicate sols, alumina sols (including pseudo boehmite sols) and calcium carbonate sols.

In the above-mentioned ink jet recording material, it is preferable that at least the uppermost recording layer contains a cationic compound.

In the above-mentioned uppermost recording layer, the cationic compound may be a cationic resin.

In the above-mentioned ink jet recording material, the uppermost recording layer may have 0.2 to 3.0 ml/g of fine pores.

In the above-mentioned ink jet recording material, it is preferable that when an ink jet printing applied to the crack-formed recording layer in the underrecorded layer, and the printed ink dots having a diameter of 50 μm are observed by an optical microscope at a magnification of 150, cracks are found in the printed ink dots in the number corresponding to 60% or more of the total number of the printed ink dots.

The above-mentioned ink jet recording material which comprises an ink receiving layer formed on a support and comprising at least two recording layers, at least one of the recording layers, other than an uppermost recording layer which is located farthest from the support having cracks, can be produced by the process in which at least an uppermost recording layer is coated on a casting layer, and dried, and the resultant layer is transferred onto a support (or an additional recording layer formed on the support), and the resultant laminate is separated from the casting layer.

In the above-mentioned process, the recording layer coated on the casting layer is transferred and bonded to the support through an intermediate layer.

In the above-mentioned process, the intermediate layer is a pressure-sensitive adhesive layer, a adhesive layer or another recording layer.

In another process for producing the above-mentioned ink jet recording material which comprises at least two recording layers formed on a support, at least one of the recording layers other than a uppermost recording layer located farthest from the support having cracks, an underrecording layer is coated and dried on the support, a solvent or water is coated on the dried underrecording layer; an uppermost recording layer is coated on the solvent or water-coated underrecording layer; and then the resultant laminate is dried.

The above-mentioned embodiment of the ink jet recording material of the present invention is characterized in that at least one recording layer other than an uppermost recording layer located farthest from the support has cracks. This type of ink jet recording material exhibits a high ink-absorbing rate, a high ink-absorbing capacity and can record ink images having a high color density and a high image grade.

The term "cracks" used herein is defined as follows.

Ten randomly selected portions of an ink jet recording material are ink jet-printed at a dot density of 720 dpi×720 dpi by an ink jet printer, for example, INK JET PRINTER PM-700C, made by EPSON CORP., Ltd., to uniformly print ink dots having a diameter of 50 μm in the dot number of 100 to 200 per $mm^2$ The printed ink dots are observed by an optical microscope at a magnification of 100 to 200, for example 150. When cracks are formed in the ink dots in the number corresponding to 30% or more of the total number of the printed ink dots, it is established that the recording layers have cracks. When cracks are formed in the ink dots in the number corresponding to less than 30% of the total number of the printed ink dots, it is established that the recording layer have no cracks. In the ink jet recording material of the present invention, it is preferable that the ink dots having cracks are in the number corresponding to 60% or more, more preferably, 70% or more, of the total number of the ink dots.

To observe the cracks present in the underrecording layer, all the recording layers located on the underrecording layer to be observed are shaved off, and the exposed layer is observed in the same manner as mentioned above. Alternatively, the cracked layers are divided from each other by cutting, and each layer is observed in the same manner as mentioned above.

If the diameter of the ink dots is larger than 50 μm, each of the concentric circular areas in the dots are checked for the cracks.

The cracks mentioned in the present invention are in irregular form. The cracks are not formed by mechanical means and are created by controlling the drying conditions of the recording layer, the type of the pigment and the mixing ratio of the pigment to the adhesive.

When the volume of the cracks is too small, the effect of the cracks on increasing the ink-absorbing capacity may be unsatisfactory. Also, the volume of the cracks is too large, the surface of the recording layer may be roughened. The width of the cracks is not limited to a specific range of value. Preferably, the crack width is in the range of from 0.5 to 10 μm. When the crack width is too large, the uppermost recording layer surface may be roughened and may exhibit an unsatisfactory gloss. There is no specific limitation to the length of the cracks. Preferably, the length of the cracks is 5 to 200 μm measured between branching points of the cracks. The volume of the cracks in the recording layer is preferably 0.5 to 10 ml/g measured by a mercury-penetrating method.

The support usable for the embodiment of the ink jet recording material of the present invention may be selected from those as mentioned above. The support may be transparent or opaque.

In the above-mentioned embodiment, the ink receiving layer comprises two or more recording layers and each preferably comprises a binder and a pigment. The pigment includes the above-mentioned pigments and is preferably selected from amorphous silica, alumina silicate, alumina and calcium carbonate pigments, which are usable for conventional coated paper sheets.

To obtain a high color density of the printed ink images and a high gloss, the pigment secondary particles have an average secondary particle size of 10 to 400 nm, preferably 10 to 300 nm, particularly 20 to 200 nm, formed by agglomeration of primary particles having an average primary particle size of 3 to 40 nm, more particularly 5 to 30 nm.

The secondary particles of a pigment having an average secondary particle size of 10 to 400 nm can be produced by applying a strong force to trade pigment particles by mechanical means. Namely, the target secondary pigment particles can be obtained by the above-mentioned breaking down method (by which a material in a lump form is divided into fine particles).

The binder usable for each recording layer can be selected from the above-mentioned water-soluble resins and polymer latices usable for the conventional coated paper sheets. These materials for the binder may be employed alone or in a mixture of two or more thereof.

To increase the bonding strength between the support and the ink-receiving layer and between the two or more recording layers, the water-soluble resins are preferably employed as a binder. Particularly, when a PVA having a degree of polymerization of 2000 or more is employed as a binder, the bonding strength between the support and the ink-receiving layer and between the two or more recording layers is high, and the ink-absorbing rate, the ink-absorbing capacity, the water resistance and the color density of the printed ink images are enhanced.

The solid weight ratio of the pigment to the binder in each recording layer is preferably 100/2 to 100/200, more preferably 100/5 to 100/100. When the proportion of the binder is too high, the size of the pores formed between the pigment particles is small, and thus the ink-absorbing rate decreases, and cracks are difficult to formed. Also, when the proportion of the binder is too low, the bonding strength between the ink receiving layer and the support or between the two or more recording layers is unsatisfactory, and a powdering phenomenon may occur during the use of the resultant ink jet recording material.

To create cracks in the recording layers, it may be necessary to decrease the proportion of the binder and to apply a high drying temperature to the recording layer. The creation of the cracks depends on the particle size and type of the pigment, the type of the binder, and the mixing ratio of the pigment to the binder. For example, as a pigment, silica secondary particles having an average secondary particle size of 70 nm, consisting essentially of primary particles having an average primary particle size of 15 nm and dispersed in water to form an aqueous silica slurry, are used, and as a binder, a PVA having a polymerization degree of 2400 and a saponification degree of 98% or more, and made by K.K. Kuraray, trademark: PVA-124) is used, and when the resultant recording layer is dried at a temperature of 120° C., cracks are created when the solid mixing weight ratio of the silica to the PVA is 100/50, and the amount of the recording layer is 20 $g/m^2$. However, when the solid mixing weight ratio of the silica to the PVA is 100/60, no cracks are formed. Also, even when the solid mixing weight ratio of the silica to the PVA is 100/50, when the drying temperature is 80° C., no cracks are created in the recording layer. Next, for example, when, as a pigment, a colloidal silica in the form of primary particles with an average particle size of 45 nm (trademark: ST-XL, made by Nissan KAGAKU K.K.) is used, and as a binder, the same polyvinyl alcohol as mentioned above is used, cracks are created under the conditions of a pigment/binder solid weight mixing ratio of 100/10, a coating amount of 20 g/$m^2$ and a drying temperature of 120° C. However, when the pigment/binder solid weight mixing weight was changed to 100/20, no cracks are created.

For the purpose of enhancing the ink-fixing property of the ink receiving layer, a cationic resin is optionally contained in the recording layer.

Particularly, the cationic resin is preferably contained in the upperrecording layer. The cationic resin can be selected from those mentioned above. The cationic resin is preferably employed in an amount of 1 to 30 parts by weight, more preferably 5 to 20 parts by weight, per 100 parts by weight of the pigment.

The recording layers optionally contains at least one additive selected from conventional dispersants, viscosity modifiers, anti-foaming agents, coloring materials, antistatics and preservatives.

The ink receiving layer may be formed in a two-layered structure or a three or more-layered structure. The amount of each layer is not limited. Preferably, the uppermost recording layer is in an amount of 1 to 50 g/$m^2$, more preferably 2 to 20 g/$m^2$, and the amount of each of the recording layers other than the uppermost recording layer is preferably 1 to 60 g/$m^2$, more preferably 2 to 40 g/$m^2$. Since the recording layer having cracks exhibits an increased ink-absorbing capacity, the amount of the recording layer is preferably adjusted to 1 to 40 g/$m^2$, more preferably 2 to 30 g/$m^2$, to completely absorb the ink applied to a high color density portion of the ink jet recording material. When the amount of the recording layer is too small, a uniform recording layer may be difficult to obtain, and when the amount of the recording layer is too large, the effect of the recording layer may be saturated and an economical disadvantage may occur.

In a more preferable embodiment of the process of the present invention, an upperrecording layer (which may consists of an uppermost recording layer alone or of a combination of an uppermost recording layer and at least one recording layer) is formed in the form of a film on a casting surface; separate under recording layers are formed on a support under conditions causing cracks to be created in at least one of the underrecording layers; the underrecording layer is laminated and bonded to the upperrecording layer on the casting surface; and the resultant laminate is separated from the casting surface.

The above-mentioned process may be modified so that the cracks are created after the lamination but before the separation of the resultant laminate from the casting surface. The resultant ink jet recording material has a further enhanced gloss.

The casting surface is formed by the materials as mentioned above, for example, plastic polymeric films, and flexible sheets having a high surface smoothness. Particularly, in consideration of production process and releasing property of the upperrecording layer from the casting surface, the polymeric films, for example, polyethylene, polypropylene and polyester films and metallic drums having a high smoothness surface are preferably used for the casting surface.

For the purpose of imparting a high gloss, the casting surface preferably has a high smoothness. Preferably, the surface roughness Ra of the casting surface is 0.5 $\mu$m or less, more preferably 0.05 $\mu$m or less. Further, the casting surface may be a semi-gloss surface or a mat-like surface which can be obtained by controlling the surface roughness Ra of the uppermost recording layer.

The casting surface may be a non-surface-treated one. However, to control the bonding strength between the casting surface and the recording layer formed on the casting surface to a low level, the casting surface may be coated with a releasing agent, for example, a silicone or a fluorine-containing resin.

As long as the recording layer formed on the casting surface can be bonded to a support or to another recording layer formed on the support, there is no limitation to the bonding method. Usually, they are bonded by directly superposing the support or recording layer-coated support on the recording layer formed on the casting surface, and then press-bonding under presence. Alternatively, a recording layer is formed on a support; the recording layer on the support is, while it is in a wetted condition, laminated and bonded to a recording layer formed on a casting layer; the laminate is dried and separated from the casting surface.

The recording layers and the intermediate layer can be formed by a conventional coater, for example, a die, blade, air knife, roll, bar, gravure, rodblade, tip or curtain coater.

In this embodiment of the ink jet recording material of the present invention, at least one of the recording layers other than the uppermost recording layer must have cracks. The coating method for the ink jet recording material will be explained below.

Generally, it was difficult to form an upperrecording layer and an underrecording layer so that the underrecording layer has cracks and the upperrecording layer has no cracks or cracks in a number less than that of the cracks in the underrecording layer. When the underrecording layer has cracks, and an upperrecording layer is formed on the cracked underrecording layer, the pigment and binder flow down into the cracks so as to fill the cracks and thus the resultant ink receiving layer does not exhibit a high ink-absorbing capacity.

In the present invention, as a result of extensive study of the inventors of the present invention, an underrecording layer is coated on a support; cracks are created in the underrecording layer; the cracks are filled with a solvent, for example, an alkyl alcohol, or water; the solvent or water-treated underrecording layer is coated with an upperrecording layer and dried. The resultant ink receiving layer thus includes an underrecording layer having cracks. Particularly, it is preferable that the volume of the pores having a pore radius of 6 $\mu$m or less is in the range mentioned above.

Alternatively, an upperrecording layer is formed on a casting surface and dried, and optionally coated with an additional recording layer to increase the ink-absorbing capacity of the ink receiving layer; separately an underrecording layer is coated on a support, cracks are formed in the underrecording layer; and then the underrecording layer is laminated and bonded to the upperrecording layer; and the resultant laminate is separated from the casting surface, to produce an ink jet recording material having a photographic sheet-like high gloss.

The lamination is preferably carried out under a pressure of, for example, 5 to 150 kg/cm and optionally by heating at a temperature of, for example, 30 to 100° C. More preferably, the lamination is carried out by blowing water vapor or applying water onto at least one of the underrecording layer and the upperrecording layer to cause the water vapor-blown or water-applied recording layer to contain water in an amount of 50 to 350% based on the bone dry weight of the recording layer, and the laminated underrecording layer and upperrecording layer are bonded under pressure.

Also, the ink jet recording material can be produced by coating a recording layer (underrecording layer) on a support, laminating, while the recording layer is kept in a wetted condition, the recording layer onto an upperrecording layer which was formed on a casting surface and dried; drying the resultant laminate to create cracks in the underrecording layer; and then separating the dried laminate from the casting surface. The cracks can be created by decreasing the amount of the binder in the underrecording layer or by increasing the drying temperature, as mentioned above.

Referring to FIG. 1, an ink jet recording material 1 comprises a support 2, an underrecording layer 3 formed on the support 2 and having cracks 5 and an upperrecording layer 4 formed on the underrecording layer 3.

Referring to FIG. 2, an ink jet recording material 1 comprises a support 2, an underrecording layer 3 formed on the support 2 and having a lower layer 3*a* having cracks and an upper layer 3*b* formed on the lower layer 3*a*, and an upperrecording layer 4 formed on the underrecording layer 3.

In the above-mentioned ink jet recording material of the present invention, the cracks are present in the recording layers other than the uppermost recording layer, and thus when the ink penetrates into the underrecording layer, there is a risk of blotting the ink images. Accordingly, the uppermost recording layer preferably has no cracks or the cracks in the upperrecording layer are smaller than in the underrecording layer. When the underrecording layer has cracks, even when no cracks are present in the upperrecording layer, the ink-absorbing rate increases, the dye in the ink is fixed in the upperrecording layer, and water or solvent in the ink is absorbed only in the underrecording layer. When the cracks present in the uppermost recording layer are in a small number, the printed ink dots have a high degree of roundness and thus the printed ink images exhibit a high accuracy and sharpness.

To fix the dye in the ink in the uppermost recording layer, the uppermost recording layer preferably has a pore volume of 0.2 to 3.0 ml/g, more preferably 0.5 to 2.5 ml/g. The pore volume was determined by forming the recording layer on a plastic film to prevent an influent of the support, removing the film from the recording layer by using, for example, a cutter, and measuring the pore volume of the recording layer by a mercury penetration method using Poresizer 9320 made by SHIMAZU SEISAKUSHO.

The ink usable for the ink jet recording material of the present invention, contains a solvent which comprises at least one member selected from water and water-soluble organic solvents, for example, alkyl alcohols having 1 to 4 carbon atoms, for example, methyl alcohol, ethyl alcohol, n-propyl alcohol, isopropyl alcohol, n-butyl alcohol, and isobutyl alcohol; ketones and ketone alcohols, for example, acetone and diacetone-alcohol; polyalkyleneglycols, for example, polyethyleneglycol and polypropyleneglycol; alkylene glycols having 1 to 6 alkylene groups, for example, ethylene glycol, propylene glycol, butylene glycol, triethylene glycol, thiodiglycol, hexylene glycol and diethylene glycol; amides, for example, dimethylformamide; ethers, for example, tetrahydrofuran; glycerol; and lower alkyl ethers of polyhydric alcohols, for example, ethyleneglycolmethylether, diethyleneglycolmethyl(ethyl) ether, and triethyleneglycolmonomethylether.

The present invention will be further illustrated by the following examples which are merely representative and do not restrict the scope of the present invention in any way.

In the examples and comparative examples, the "part" and "%" are —part by solid weight— and —% by solid weight", unless specifically indicated otherwise.

In the group I of examples and comparative examples, the following pigments were employed.

It should be noted that the pulverizing and dispersing procedure did not cause the average primary particle size of the pigment to be changed.

[Silica Sol I-A]

A synthetic amorphous silica (NIPSIL® HD-2, made by NIPPON SILICA INDUSTRIAL CO., LTD.) having an average secondary particle size of 3 μm and an average primary particle size of 11 nm was pulverized and dispersed by a sand grinder, and then by a pressure type homogenizer, and then a pulverizing and dispersing procedure with a sand grinder and ultrasonic homogenizer was repeatedly applied to the silica pigment until the average secondary particle size reached 70 nm, to provide a dispersion having a pigment solid content of 7%.

[Silica Sol I-B]

A synthetic amorphous silica (NIPSIL® E-1011, made by NIPPON SILICA INDUSTRIAL CO., LTD.) having an average secondary particle size of 1.5 μm and an average primary particle size of 24 nm, was pulverized and dispersed by a sand grinder and then by a pressure-type homogenizer; and then a pulverizing and dispersing procedure with a sand grinder and then with an ultrasonic homogenizer was repeatedly applied to the silica pigment until the average secondary particle size reached 100 nm, to provide a silica sol I-B having a solid pigment content of 10%.

EXAMPLE I-1

A 10% aqueous coating liquid containing a mixture of 100 parts of silica sol I-B with 40 parts of a polyvinyl alcohol (trademark: PVA-135H, made by KURARAY CO., LTD.) having a degree of polymerization of 3500 and a degree of saponification of 99% or more, was prepared.

As a support, an polyethylene-laminated paper sheet 30 which was produced by laminating polyethylene in a thickness of 25 μm on a surface of a trade coated paper sheet (trademark: OK COAT, made by OJI PAPER CO., LTD.) having a basis weight of 127.9 $g/m^2$, by an extrusion lamination method, and will be referred to as a laminated paper sheet hereinafter, was employed.

The 10% aqueous coating liquid was coated on the laminate surface of the laminated paper sheet and dried, to form an underrecording layer in an amount of 30 $g/m^2$.

Then, a 7% aqueous coating liquid containing a mixture of 100 parts of silica sol I-A with 30 parts of PVA (PVA-135H) was prepared and coated on the underrecording layer and dried, to form an upperrecording layer in an amount of 10 $g/m^2$.

An ink jet recording material of the present invention was obtained.

EXAMPLE I-2

An ink jet recording material of the present invention was produced by the same procedures as in Example I-1 with the following exceptions. On the underrecording layer containing silica sol I-B and formed on the laminated paper sheet, an upperrecording layer was coated by the following procedures.

When 100 parts of silica sol I-A were mixed with 15 parts of a cationic resin consisting of a diallyldimethylammonium chloride-acrylamide copolymer (trademark: PAS-J-81, made by NITTO BOSEKI CO., LTD.), the silica sol particles were agglomerated. The agglomerated silica particles were pulverized and dispersed by a pressure type homogenizer until the average secondary particle size reached 120 nm. The average primary particle size was kept at 11 nm. The resultant cationic resin-containing silica sol was mixed with 25 parts of a polyvinyl alcohol (trademark: PVA-135H, made by KURARAY CO., LTD.), and the resultant coating liquid was coated on the underrecording layer and dried to form an upperrecording layer in an amount of 10 $g/m^2$.

EXAMPLE 1-3

The same cationic resin containing silica sol as in Example I-2 was added with 25 parts of a polyvinyl alcohol (trademark: PVA-135H, made by KURARAY CO., LTD.) to prepare a coating liquid for an upperrecording layer.

As a casting surface, a surface of a PET film (trademark: LUMILAR T, made by TORAY INDUSTRIES INC.) having a thickness of 50 $\mu$m and a surface roughness Ra of 0.02 $\mu$m, was employed.

The coating liquid was coated in a dry coating amount of 10 $g/m^2$ on the casting surface, and dried to form a coating layer corresponding to an upperrecording layer. After water was applied to the coating layer on the casting surface, the same silica sol I-B-containing coating liquid as in Example I-1 was coated on the water-wetted coating layer and dried to form an coating layer corresponding to an undercoating layer and in an amount of 30 $g/m^2$.

Then, the same laminated paper sheet was laminated and bonded, at the laminate surface thereof, to the coating layer at a calendering temperature of 75° C. under a calendering linear pressure of 20 kg/cm. Then the PET film was removed from the resultant laminate.

An ink jet recording material of the present invention was obtained.

EXAMPLE I-4

On the laminate surface of the same laminated paper sheet as in Example I-1, an acrylic ester adhesive (trademark: A-02, made by NIPPON CARBIDE INDUSTRIES CO., LTD.) was coated in an amount of 15 $g/m^2$, and dried.

A coating liquid was prepared by mixing the same cationic resin-containing silica sol as in Example I-2 with 25 parts of a polyvinyl alcohol (trademark: PVA-135H, made by KURARAY CO., LTD.). The coating liquid was coated on the same casting surface as in Example I-3 (the PET film, trademark: LUMILAR T, made by TORAY INDUSTRIES INC.) having a thickness of 50 $\mu$m and a surface roughness of 0.02 $\mu$m and dried, to form a coating layer in an amount of 10 $g/m^2$, corresponding to an upperrecording layer.

After applying water to the dried coating layer, the same coating liquid containing the silica sol I-B as in Example I-1 was coated on the water-applied coating liquid and dried, to form a coating layer in an amount of 30 $g/m^2$ corresponding to an underrecording layer. The adhesive layer on the laminated paper sheet was laminated and bonded to the coating layer corresponding to the underrecording layer. The resultant laminate was separated from the PET film.

An ink jet recording material of the present invention was obtained.

EXAMPLE I-5

A surface of a trade coated paper sheet (trademark:

OK COAT, made by OJI PAPER CO., LTD.) having a basis weight of 127.9 $g/m^2$ was laminated with a cross-linked thermoplastic polyethyleneoxide (trademark: AQUACOK, made by SUMITOMO SEIKA CHEMICALS CO., LTD.) in an amount of 25 $g/m^2$.

Separately, a coating liquid prepared by mixing the same cationic resin-containing silica sol as in Example I-2 with 25 parts of PVA (trademark: PVA-135H, made by KURARAY CO., LTD.), was coated on a casting surface consisting of a surface of a PET film (trademark: LUMILAR T, made by TORAY INDUSTRIES INC.) having a thickness of 50 $\mu$m and a surface roughness Ra of 0.02 $\mu$m, and dried to form a coating layer having a weight of 10 $g/m^2$ and corresponding to an upperrecording layer.

After applying water to the coating layer, the same silica sol I-B-containing coating liquid as in Example I-1 was coated on the water-wetted coating layer and dried to form a coating liquid in an amount of 30 $g/m^2$ corresponding to an underrecording layer. The coating layer was laminated and bonded to the laminated polyethyleneoxide layer on the coated paper sheet. The resultant laminate was separated from the PET film.

An ink jet recording material of the present invention was obtained.

COMPARATIVE EXAMPLE I-1

A 7% aqueous coating liquid containing a mixture of 100 parts of silica sol I-A with 30 parts of PVA (trademark: PVA-135H, made by KURARAY CO., LTD.) was coated on a surface of the same laminated paper sheet as in Example I-1, and dried, to form a coating layer in an amount of 10 $g/m^2$.

A comparative ink jet recording material was obtained.

COMPARATIVE EXAMPLE I-2

A 7% aqueous coating liquid containing a mixture of 100 parts of silica sol I-A with 30 parts of PVA (trademark: PVA-135H, made by KURARAY CO., LTD.) was coated on a surface of the same laminated paper sheet as in Example I-1, and dried, to form a coating layer in an amount of 40 $g/m^2$.

A comparative ink jet recording material was obtained.

COMPARATIVE EXAMPLE I-3

A 10% aqueous coating liquid containing a mixture of 100 parts of silica sol I-B with 40 parts of PVA (trademark: PVA-135H, made by KURARAY CO., LTD.) was coated on a surface of the same laminated paper sheet as in Example I-1, and dried, to form a coating layer in an amount of 40 $g/m^2$.

A comparative ink jet recording material was obtained.

COMPARATIVE EXAMPLE I-4

A 7% aqueous coating liquid containing a mixture of 115 parts of the same cationic resin-containing silica sol as in Example I-2 with 25 parts of PVA (trademark: PVA-135H, made by KURARAY CO., LTD.) was coated on a surface of the same laminated paper sheet as in Example I-1, and dried, to form a coating layer in an amount of 30 $g/m^2$.

On the coating layer, a 10% aqueous coating liquid containing a mixture of 100 parts by weight of silica sol I-B with 40 parts of a PVA (trademark: PVA-135H) was coated and dried to form a coating layer in an amount of 10 $g/m^2$.

A comparative ink jet recording material was obtained.

COMPARATIVE EXAMPLE I-5

A trade gloss paper sheet (trademark: KONICA PHOTO-JET PAPER, made by KONICA) in which a hydrophilic resin is coated on a support paper sheet was employed as a comparative ink jet recording material.

[Evaluation]

The ink-absorbing property, gloss and color density of ink images of the ink jet recording materials of Examples I-1 to I-5 and Comparative Examples I-1 to I-5 were tested and evaluated by the methods as shown below.

In the testings on the gloss, ink-absorbing property and color density of ink images, a record was made in each ink jet recording material by a trade ink jet printer (trademark: PM-700 C, made by EPSON CORP., LTD.), and a gloss, ink-absorbing property and color density of a solid printed portion were measured.

[Ink-absorbing Property]

A solid print was provided by overlapping a yellow-colored ink, a magenta-colored ink and a cyan-colored ink on each other. Each 5 seconds immediately after the printing, a woodfree paper sheet was superposed on the solid print to check whether the ink in the solid print is transferred to the paper sheet. The ink drying time, after which no transfer of the ink occured, was determined. The ink-absorbing property of the ink jet recording material was evaluated in the following four classes.

| class | Ink-drying time |
|---|---|
| 4 | Less than 5 seconds |
| 3 | 5 seconds or more but less than 15 seconds |
| 2 | 15 seconds or more but less than 30 seconds |
| 1 | 30 seconds or more |

When the ink-drying time is less than 15 seconds (class 4 or 3), the ink jet recording material is evaluated to be excellent or satisfactory in the ink-absorbing rate and capacity.

[Gloss (luster) of Printed Portion]

The gloss of printed portion was evaluated by observing each of black, yellow, cyan and magenta-colored images at an inclined angle by the naked eye, in the following four classes.

| class | Gloss |
|---|---|
| 4 | Excellent and similar to silver salt type photographic colored images |
| 3 | Satisfactory but slightly lower than silver salt type photographic colored images |
| 2 | Similar to trade coated paper sheets or art paper sheets |
| 1 | No gloss |

[Color Density of Ink Image]

A solid black-colored ink image was subjected to a measurement of color density by MACBETH REFLECTION COLOR DENSITY TESTER (model: RD-920). The color density was represented by an average of five measurement data.

[Moisture Resistance for Storage]

The print was stored in a constant temperature constant humidity vessel at a temperature of 40° C. at a humidity of 90% for 48 hours. After the storage, the print was removed from the vessel and checked on whether blotting of the ink occurs. The test results were evaluated in the following four classes.

| class | Moisture resistance |
|---|---|
| 4 | No ink-blotting |
| 3 | Slight ink-blotting Usable in practice |
| 2 | Certain ink-blotting Sometimes unusable in practice |
| 1 | Severe ink-blotting Unusable in practice |

[Water Resistance of Ink-receiving Layer]

A water drop was placed on an ink-receiving layer, and 5 minutes after the water-dropping, the water-wetted portion was lightly rubbed and the change occurred in the ink-receiving layer was checked and evaluated in the following three classes.

| class | Water resistance |
|---|---|
| 3 | No change |
| 2 | A portion of the ink-receiving layer is removed. |
| 1 | The ink receiving layer is completely removed. |

The test results are shown in Table 1.

TABLE 1

| Example No. | | Item | | | | |
|---|---|---|---|---|---|---|
| | | Ink-absorbing property | Gloss of printed portion | Color density of image | Moisture resistance for storage | Water resist-ance |
| Example | I-1 | 3 | 3 | 2.46 | 3 | 3 |
| | I-2 | 3 | 3 | 2.45 | 4 | 3 |
| | I-3 | 3 | 4 | 2.57 | 4 | 3 |
| | I-4 | 4 | 4 | 2.59 | 4 | 3 |
| | I-5 | 4 | 4 | 2.61 | 4 | 3 |
| Comparative | I-1 | 1 | 3 | 2.46 | 3 | 3 |
| Example | I-2 | 3 | 1 | 2.43 | 3 | 3 |
| | I-3 | 3 | 3 | 1.91 | 3 | 3 |
| | I-4 | 3 | 2 | 1.95 | 3 | 3 |
| | I-5 | 1 | 2 | 2.40 | 2 | 1 |

Table 1 clearly shows that the ink jet recording materials in accordance with the present invention are excellent or satisfactory in ink-absorbing property, gloss, color density of ink image, moisture resistance and water resistance.

In the group of Examples II-1 to 3 and Comparative Examples II-1 and 2, the following pigments were employed.

[Silica Sol II-A]

A synthetic amorphous silica (made by NIPPON SILICA INDUSTRIAL CO., LTD.) having an average primary particle size of 11 nm and an average secondary particle size of 3 $\mu$m was pulverized and dispersed by a sand grinder and then by a pressure-type homogenizer (made by SMT COMPANY, trademark: SUPER HIGH PRESSURE TYPE HOMOGENIZER GM-1) and the above-mentioned pulverizing and dispersing procedures were repeatedly carried out until the average secondary particle size reached 70 nm. A 5% aqueous dispersion of the silica pigment was obtained. No change occurred in the average primary particle size of the silica pigment.

[Silica Sol II-AK]

When 100 parts of silica sol II-A was mixed with 15 parts of a trade cationic resin (trademark: SUMILASE RESIN SR-1001, made by SUMITOMO CHEMICAL CO., LTD.), the silica pigment particles agglomerated. The agglomerated pigment mixture was pulverized and dispersed by a sand grinder and then with a pressure type homogenizer (trademark: SUPER HIGH PRESSURE HOMOGENIZER GM-1, made by SMT COMPANY), and the pulverizing and dispersing procedures were repeatedly carried out until the average secondary particle size reached 150 nm. A 6% dispersion of the silica pigment-cation resin mixture was obtained.

[Alumina Silicate Fine Particles II]

Isopropyl alcohol in an amount of 100 g was placed in a glass reactor (separable flask) having a capacity of 2 liters and equipped with a stirrer having a diameter of 3 cm and comprising three stirring rings and a thermometer, and heated to a liquid temperature of 60° C. by using an oil bath heater. While the stirrer was rotated at a rotation speed of 100 rpm to agitate the liquid in the reactor, 5 g of aluminum isopropoxide (made by WAKO PURE CHEMICAL INDUSTRIES, INC.) were added, and then 1 g of an acid catalyst consisting of acetic acid (made by WAKO PURE CHEMICAL INDUSTRIES, LTD.) was further added to the isopropyl alcohol. The reaction mixture was refluxed, while maintaining the refluxing temperature constant, for 24 hours.

Separately, in the same type of glass reactor as mentioned above, was charged 100 g of ion-exchanged water and the charge was heated to a temperature of 60° C., and 1.8 g ethyl orthosilicate (made by WAKO PURE CHEMICAL INDUSTRIES, LTD.) was added and then 1 g of an acid catalyst consisting of nitric acid (made by WAKO PURE CHEMICAL INDUSTRIES, LTD.) was added to the ion-exchanged water. The mixture was refluxed for 24 hours while maintaining the refluxing temperature constant.

The ethyl orthosilicate-nitric acid-ion-exchanged water solution was mixed with the aluminum isopropoxide-acetic acid-isopropyl alcohol solution, and the mixture was stirred and heated at a temperature of 60° C. for 6 hours to prepare fine particles of alumina silicate. Then, the reaction mixture was concentrated by evaporation at a temperature of 60° C., to provide agglomerated particles of alumina silicate. In the resultant particles, the composition ratio of alumina to silica was 3:2 and the average primary particle size was 10 nm. The agglomerated particles were mixed with water and subjected to repeated pulverizing and dispersing procedures with a sand grinder and then with a ultrasonic homogenizer until the average secondary particle size reached 60 nm, to provide an 8% aqueous dispersion.

EXAMPLE II-1

A 7% aqueous coating liquid was prepared by mixing 100 parts of silica sol II-AK with 40 parts of a polyvinyl alcohol (trademark: PVA-135H, made by KURARAY Co., LTD.) having a degree of polymerization of 3500 and a degree of saponification of 99% or more. This coating liquid will be referred to as "coating liquid α". The coating liquid a was coated on a casting surface consisting of a surface of a PET film (trademark: LUMILAR T, made by TORAY INDUSTRIES, INC.) having a thickness of 75 μm and a surface roughness Ra of 0.02 μm, and dried to form a coating layer 2 having a weight of 30 $g/m^2$ and corresponding to an upperrecording layer.

Separately, a 7% aqueous coating liquid was prepared by mixing 100 parts of synthetic amorphous silica particles (trademark: NIPSIL G-300, made by NIPPON SILICA INDUSTRIAL CO., LTD.) having an average secondary particle size of 2.3 μm and an average primary particle size of 22 nm with 40 parts of a polyvinyl alcohol (trademark: R-1130, made by KURARAY CO., LTD.) having a degree of polymerization of 1800. This aqueous coating liquid will be referred to as "coating liquid β".

The coating liquid β was coated on a surface of a trade paper sheet (trademark: OK PRINCE, made by OJI PAPER CO., LTD., pulp composition: L wood pulp 100%, freeness: 430 ml) having a basis weight of 127.9 $g/m^2$, to form a coating layer 1 corresponding an underrecording layer and having a dry solid weight of 10 $g/m^2$.

The coating layer 1 was, while the coating layer 1 was kept in a wetted condition, laminated and bonded to the coating layer 2, and dried. The resultant dry laminate was separated from the casting PET film surface.

An ink jet recording material of the present invention was obtained.

EXAMPLE II-2

An ink jet recording material of the present invention was produced by the same procedures as in Example II-1, except that silica sol II-AK was replaced by silica sol II-A.

EXAMPLE II-3

An ink jet recording material of the present invention was produced by the same procedures as in Example II-1, except that silica sol II-AK was replaced by alumina silicate fine particles II.

COMPARATIVE EXAMPLE II-1

A comparative ink jet recording material was produced by coating the same coating liquid a as in Example II-1 on a trade paper sheet (trademark: OK PRINCE, made by OJI PAPER CO., LTD., pulp composition: L wood pulp 100%, freeness: 430 ml) having a basis layer having a weight of 30 $g/m^2$.

COMPARATIVE EXAMPLE II-2

A comparative ink jet recording material was prepared by the same procedures as in Comparative Example II-1, except that the coating liquid α was replaced by the same coating liquid β as in Example II-1.

[Evaluation]

The gloss of ink images, smoothness of ink receiving layer, ink-absorbing property, water resistance of ink images and color density of ink images of each of the ink jet recording materials of Examples II-1 to II-3 and Comparative Examples II-1 and II-2 were tested and evaluated by the methods shown below.

The image gloss, ink absorption, ink water resistance and image color density were tested and evaluated on the solid images printed by a trade ink jet printer (trademark: PM-700C, made by EPSON CORP., LTD.)

[Gloss (luster) of Image]

The gloss of image was determined by observing the solid image at an inclined angle of 20 degrees by the naked eye, into the following four classes.

| class | Gloss |
|---|---|
| 4 | High gloss similar to the gloss of photographic colored images |
| 3 | Satisfactory gloss which is slightly lower than the gloss of photographic colored images |
| 2 | Surface is roughened and smoothness is unsatisfactory |
| 1 | Surface is significantly roughened and appearance is very bad |

[Smoothness of Ink Receiving Layer]

The smoothness of an ink receiving layer was evaluated by naked eye observation of the surface of the coating layer, into the following three classes.

| class | Surface condition |
|---|---|
| 3 | Surface roughness is small. Smoothness is high. |
| 2 | Surface is roughened. Smoothness is low. |
| 1 | Surface is severely roughened. Appearance is bad. |

[Ink-absorbing Property]

A sample of an ink jet recording material having dimensions of 10 cm×10 cm was attached to a center portion of a A4 size PPC paper sheet, a black ink was extruded in an amount of 30 $g/m^2$ onto the sample to form a solid print. The ink absorbing condition on the sample was observed. Also, a woodfree paper sheet was superposed on the ink-applied sample to determine an ink drying time after which time was passed, no ink was transferred from the sample to the woodfree paper sheet.

The ink absorbing property was evaluated into the following four classes.

| class | In-drying time |
|---|---|
| 4 | Less than one minute |
| 3 | One minute or more but less than 2 minutes |
| 2 | Two minutes or more but less than 5 minutes |
| 1 | Five minutes or more |

[Water Resistance of Ink Image]

An ink jet recording material was printed with an ink and left to stand for 24 hours. Thereafter, a water drop was placed on the ink image and removed by wiping one minute after the water dropping.

The condition of the water-wetted portion was evaluated by naked eye into the following four classes.

| class | Water resistance |
|---|---|
| 4 | No blotting of ink is found |
| 3 | Substantially no ink blotting is found |
| 2 | Ink is slightly blotted. Usable in practice |
| 1 | Ink is blotted Practical use is difficult |

[Color Density of Image]

A black-colored ink solid print on an ink jet recording material was subjected to a measurement of color density by a MACBETH REFLECTION COLOR DENSITY TESTER (RD-920). The color density of the image was shown by an average of five measurement data.

The test results are shown in Table 2.

TABLE 2

| Example No. | Item: Gloss of printed portion | Smoothness of ink receiving layer | Ink-absorbing property | Water resistance of image | Color density of image |
|---|---|---|---|---|---|
| Example | | | | | |
| II-1 | 4 | 3 | 4 | 4 | 2.51 |
| II-2 | 4 | 3 | 4 | 2 | 2.56 |
| II-3 | 4 | 3 | 4 | 3 | 2.59 |
| Comparative Example | | | | | |
| II-1 | 2 | 2 | 4 | 4 | 2.41 |
| II-2 | 1 | 1 | 4 | 1 | 1.51 |

Table 2 shows that the ink jet recording materials of the present invention had excellent image gloss, ink-absorbing property, color density of image, satisfactory smoothness of ink receiving layer, and water resistance of image.

In the group of Examples III-1 to III-6 and Comparative Examples III-1 and III-2, the cracks formed in the ink receiving layer were checked in the following manner.

For each ink jet recording material, ten samples were collected and each was printed with 100 ink dots per $mm^2$. The dots were evenly distributed, each of the dots had a diameter of 50 μm, and the dots were produced by a trade ink jet printer (model: PM-700C, made by EPSON CORP., LTD.) having a dot density of 720 dpi×720 dpi. The printed ink dots were observed by an optical microscope at a magnification of 150. When cracks were found in the dots in the number corresponding to 60% or more of the total number of the dots printed in the 10 samples, the ink jet recording material was recognized to have sufficient cracks formed in at least one recording layer. When, for example, cracks were formed in the dots in the number corresponding to 50% of the total number of the dots printed in the 10 samples, the degree of cracks of the ink jet recording material is 50%.

In Examples III-1 to III-6 and Comparative Examples III-1 and III-2, the following pigments were employed.

[Silica Sol III-A]

Synthetic amorphous silica particles (trademark: NIPSIL HD-2, made by NIPPON SILICA INDUSTRIAL CO., LTD.) having an average secondary particle size of 3 μm and an average primary particle size of 11 nm were pulverized and dispersed by a sand grinder and then by a pressure type homogenizer, and pulverizing and dispersing procedures with a sand grinder and then with a pressure type homogenizer were repeately applied to the silica particles until the average secondary particle size reached 60 nm. A 7% silica particle dispersion was prepared.

[Silica Sol III-B]

Synthetic amorphous silica particles (trademark: NIPSIL LP, made by NIPPON SILICA INDUSTRIAL CO., LTD.) having an average secondary particle size of 3 μm and an average primary particle size of 16 nm were pulverized and dispersed by a sand grinder and then by a pressure type homogenizer, and pulverizing and dispersing procedures with a sand grinder and then with a pressure type homogenizer were repeately applied to the silica particles until the average secondary particle size reached 100 nm. A 9% silica particle dispersion was prepared.

[Silica Sol III-C]

Synthetic amorphous silica particles (trademark: NIPSIL E-1011, made by NIPPON SILICA INDUSTRIAL CO., LTD.) having an average secondary particle size of 1.5 μm and an average primary particle size of 24 nm were pulverized and dispersed by a sand grinder and then by a pressure type homogenizer, and pulverizing and dispersing procedures with a sand grinder and then with a pressure type homogenizer were repeately applied to the silica particles until the average secondary particle size reached 150 nm. A 12% silica particle dispersion was prepared.

EXAMPLE III-1

As a support, a laminated paper sheet prepared by laminating polyethylene layer, at a thickness of 25 μm by an extrusion-lamination method onto a trade coated paper sheet (trademark: OK COAT, made by OJI PAPER CO., LTD.) having a basis weight of 127.9 g/m$^2$, was employed. This laminated paper sheet will be referred to as a "laminate sheet" hereinafter.

A 10% aqueous coating liquid comprising a mixture of 100 parts of silica sol III-C with 35 parts of a polyvinyl alcohol (trademark: PVA-135H, made by KURARAY CO., LTD.) having a degree of polymerization of 3500 and a degree of saponification of 99% or more, was coated on the polyethylene-coated surface of the laminate sheet and dried at a temperature of 120° C., to form an underrecording layer having a dry weight of 20 g/m$^2$. The resultant underrecording layer had a degree of cracks of 80%.

The underrecording layer was wetted with water in an amount of 20 g/m$^2$, and then coated with a 7% aqueous coating liquid prepared from a mixture of 100 parts of silica sol III-A with 30 parts of a PVA (PVA-135H), and dried at a temperature of 50° C. to form an upperrecording layer having a degree of cracks of 30% and a pore volume of 0.9 ml/g.

An ink jet recording material of the present invention was obtained.

EXAMPLE III-2

Silica sol III-A in an amount of 100 parts was mixed with 15 parts of cationic resin consisting of diallyl-dimethyl ammonium chloride-acrylamide copolymer (trademark: PAS-J-81, made by NITTO BOSEKI CO., LTD.). The resultant mixture exhibited an increased viscosity and silica particles were agglomerated. The mixture was pulverized and dispersed by a pressure type homogenizer until the average agglomerated particle size reached 100 nm. Then, the resultant cationic resin-containing silica sol was further mixed with 20 parts of a polyvinyl alcohol (PVA-135H), to provide an 8% aqueous coating liquid.

The same support as in Example III-1 was coated with the same silica sol III-C-containing underrecording layer as in Example III-1. After wetting the underrecording layer with water in an amount of 20 g/m$^2$, the above-mentioned coating liquid was coated on the water-wetted underrecording layer, and dried at a temperature of 50° C., to form an upperrecording layer having a dry weight of 8 g/m, a degree of cracks of 30%, and a pore volume of 0.83 ml/g.

EXAMPLE III-3

The same diallyl-dimethyl ammonium chloride-acrylamide copolymer-containing silica sol III-A as in Example III-2 and in an amount of 115 parts was mixed with 20 parts of a polyvinyl alcohol (PVA-135H), to provide an aqueous coating liquid having a solid content of 8%.

The coating liquid was coated on a surface of a PET film (trademark: LUMILAR T, made by TORAY INDUSTRIES INC.) having a thickness of 50 μm and a surface roughness Ra of 0.02 μm, used as a casting surface, and dried at a temperature of 40° C., to form a coating layer corresponding to an upperrecording layer having a weight of 8 g/m$^2$ and a degree of cracks of 10% or less.

Separately, a 10% aqueous coating liquid containing a mixture of 100 parts of silica sol III-C with 30 parts of a polyvinyl alcohol (PVA-135H) was coated on a surface of a trade woodfree paper sheet having a basis weight of 157 g/m$^2$, and dried at a temperature of 120° C., to form an underrecording layer having a weight of 20 g/m$^2$ and a degree of cracks of 90%.

After the cationic resin-containing coating layer formed on the PET film was wetted with 5 g/m$^2$ of water, the underrecording layer was laminated and bonded to the wetted coating layer at a calendering temperature of 75° C. under a calendering linear pressure of 20 kg/cm. After drying, the resultant laminate was separated from the PET film. An ink jet recording material of the present invention was obtained. In the recording material, the upper-recording layer had a pore volume of 0.76 ml/g.

EXAMPLE III-4

The same diallyl-dimethyl ammonium chloride-acrylamide copolymer-containing silica sol III-A as in Example III-2 and in an amount of 115 parts was mixed with 20 parts of a polyvinyl alcohol (PVA-135H), to provide an aqueous coating liquid having a solid content of 8%.

The coating liquid was coated on a surface of a PET film (trademark: LUMILAR T, made by TORAY INDUSTRIES INC.) having a thickness of 50 μm, used as a casting surface, and dried at a temperature of 40° C. to form a coating layer corresponding to an upperrecording layer having a weight of 8 g/m$^2$ and a degree of cracks of 10% or less.

The coating layer was coated with a 10% aqueous coating liquid containing a mixture of 100 parts of silica sol III-B with 35 parts of a polyvinyl alcohol (PVA-135H) and dried at a temperature of 80° C. to form an intermediate recording layer having a dry weight of 10 g/m$^2$ and a degree of cracks of 20%.

Separately, a 10% aqueous coating liquid containing a mixture of 100 parts of silica sol III-C with 25 parts of a polyvinyl alcohol (PVA-135H), was coated on a surface of trade woodfree paper sheet having a basis weight of 157 g/m$^2$, to form a coating liquid layer in a dry amount of 10 g/m$^2$.

The coating liquid layer as superposed on and bonded to the intermediate recording layer, and dried at a temperature of 130° C., to form an underrecording layer. The resultant laminate was separated from the PET film. An ink jet recording material of the present invention was obtained.

In the obtained recording material, the silica sol III-C-containing underrecording layer had a degree of cracks of 95% which was measured by the method as mentioned above, after the upperrecording layer and the intermediate recording layer were removed by shaving and printed with the ink. The upperrecording layer had a pore volume of 0.76 ml/g.

EXAMPLE III-5

The polyethylene-laminated surface of the same laminate sheet in Example III-1 was coated with a 10% aqueous coating liquid containing a mixture of 100 parts of silica sol III-C with 35 parts of a polyvinyl alcohol (PVA-135H) and dried at a temperature of 100° C., to form an underrecording layer having a dry weight of 20 $g/m^2$ and a degree of cracks of 65%.

The underrecording layer was wetted with 15 $g/m^2$ of water and then coated with a 7% aqueous coating liquid containing 100 parts of silica sol III-A with 25 parts of a polyvinyl alcohol (PVA-135H) and dried at a temperature of 80° C., to form an upperrecording layer having a dry weight of 8 $g/m^2$ and a degree of cracks of 80%.

An ink jet recording material of the present invention was obtained.

COMPARATIVE EXAMPLE III-1

The polyethylene-laminated surface of the same laminate sheet as in Example III-1 was coated with a 10% aqueous coating liquid containing a mixture of 100 parts of silica sol III-B with 45 parts of a polyvinyl alcohol (PVA-135H), and dried at a temperature of 100° C., to form an ink receiving layer having a dry weight of 28 $g/m^2$ and a degree of cracks of 10% or less.

A comparative ink jet recording material was obtained.

EXAMPLE III-6

A 10% of aqueous coating liquid containing a mixture of 100 parts of silica sol III-C with 40 parts of a polyvinyl alcohol (PVA-135H) was coated on the polyethylene-laminated surface of the same laminate sheet as in Example III-1, and dried at a temperature of 100° C., to form an underrecording layer having a dry weight of 20 g/m and a degree of cracks of 20%.

The underrecording layer was wetted with water in an amount of 20 $g/m^2$, and then coated with a 7% aqueous coating liquid containing a mixture of 100 parts of silica sol III-A with 30 parts of a polyvinyl alcohol (PVA-135H), and dried at a temperature of 50° C., to form an upperrecording layer having a dry weight of 8 $g/m^2$, a degree of cracks of 30% and a pore volume of 0.91 ml/g.

An ink jet recording material of the present invention was obtained.

COMPARATIVE EXAMPLE III-2

A trade gloss paper sheet (trademark: GP-101, made by CANON) having a coating layer with a degree of cracks of 100%, was employed as a comparative ink jet recording material.

[Evaluation]

Each of the ink jet recording materials of Examples III-1 to III-6 and Comparative Examples III-1 and III-2 was subjected to evaluations of ink-absorbing rate, ink-absorbing capacity, gloss, and color density of ink image by the methods as shown below. In the evaluations of the gloss and color density of image, solid ink prints were formed by a trade ink jet printer (model: PM-700C, made by EPSON CORP., LTD.), and the gloss and color density of the solid prints were determined.

[Ink-absorbing Rate]

An yellow-colored ink, a magenta-colored ink and a cyan-colored ink were printed and overlapped on each other to form a black-colored solid print on an ink jet recording material. Every five seconds after the printing, a woodfree paper sheet was superposed on the solid print, to determining an ink-drying time after which time no ink was transferred from the solid print to the paper sheet. The ink-absorbing rate was evaluated in four classes as shown below.

| class | Ink drying time |
|---|---|
| 4 | Less than 5 seconds |
| 3 | Five seconds or more but less than 10 seconds |
| 2 | Ten seconds or more but less than 30 seconds |
| 1 | Thirty seconds or more |

[Ink-absorbing Capacity]

A sample of an ink jet recording material in dimensions of 10 cm×10 cm was attached to a center portion of an A4 size PPC paper sheet, and a black-colored ink was jetted toward the sample at an ink-extrusion amount of 40 $g/m^2$ to form a black-colored solid print. Every 10 seconds after the printing, a woodfree paper sheet was superposed on the solid print on the sample, and an ink-drying time after which time no ink was transferred from the solid print from the woodfree paper sheet, was determined.

The ink-absorbing capacity was evaluated in the four classes as shown below.

| class | Ink-drying time |
|---|---|
| 4 | Less than 10 seconds |
| 3 | Ten seconds or more but less than 30 seconds |
| 2 | Thirty seconds or more but less than one minute |
| 1 | One minute or more |

[Gloss (luster) of Ink Image]

Black-colored images, yellow-colored images, cyan-colored images and magenta-colored images formed on an ink jet recording material were observed by the naked eye at an inclined angle and gloss of the images was evaluated in the following four classes.

| class | Gloss |
|---|---|
| 4 | Similar to silver salt type photographic colored images |
| 3 | Satisfactory. Slightly lower than silver salt type photographic colored images |
| 2 | Similar to trade coated paper sheets or art paper sheets |
| 1 | No gloss |

[Color Density of Image]

A black-colored solid print formed on an ink jet recording material was subjected to a color density measurement by MACBETH REFLECTION COLOR DENSITY TESTER (model RD-920).

The color density was shown by an average of five measurement data.

[Moisture Resistance for Storage]

An ink-printed sample was stored in a constant temperature, constant humidity vessel at a temperature of 40° C. at a humidity of 90% for 48 hours. Then, the blotting of ink on the sample was checked and evaluated in the following four classes.

| class | Blotting of ink |
|---|---|
| 4 | No blotting of ink |
| 3 | Slight blotting of ink usable in practice |
| 2 | Blotting is clear. Sometimes, for example, at a high humidity or in summer season, practical use is difficult |
| 1 | Severe blotting. Practically useless |

[Corrugation]

On a sample of an ink jet recording material, a black-colored solid print was formed by overlapping yellow, cyan and magenta-colored inks, and a corrugation of the solid printed sample was checked and evaluated in the following three classes.

| class | Corrugation |
|---|---|
| 3 | No corrugation |
| 2 | Slight corrugation usable in practice |
| 1 | Severe corrugation great degradation in quality |

The test results are shown in Table 3.

TABLE 3

| | Item | | | | | |
|---|---|---|---|---|---|---|
| Example No. | Ink-absorbing rate | Ink-absorbing capacity | Gloss of image | Color density of image | Moisture resistance for storage | Corrugation |
| Example | | | | | | |
| III-1 | 4 | 4 | 3 | 2.46 | 3 | 3 |
| III-2 | 4 | 4 | 3 | 2.45 | 4 | 3 |
| III-3 | 4 | 4 | 4 | 2.54 | 4 | 3 |
| III-4 | 4 | 4 | 4 | 2.59 | 4 | 3 |
| III-5 | 4 | 4 | 2 | 2.43 | 3 | 3 |
| III-6 | 2 | 2 | 3 | 2.43 | 3 | 3 |
| Comparative Example | | | | | | |
| III-1 | 2 | 2 | 3 | 2.17 | 3 | 2 |
| III-2 | 3 | 3 | 2 | 1.95 | 3 | 1 |

Table 3 shows that the ink jet recording materials in accordance with the present invention exhibited excellent ink-absorbing property and satisfactory gloss and color density of an ink image.

What is claimed is:

1. An ink jet recording material comprising a support and a plurality of ink receiving layers comprising at least one underrecording layer formed on the support and at least one upperrecording layer formed on the underrecording layer, wherein the under and upperrecording layers comprise secondary particles of a pigment having an average secondary particle size of 10 to 400 nm and each consisting essentially of a plurality of primary particles agglomerated with each other and having an average primary particle size of 3 to 40 nm, and the average primary particle size of the primary particles contained in the underrecording layer is larger than the average primary particle size of the primary particles contained in the upperrecording layer.

2. The ink jet recording material as claimed in claim 1, wherein the average primary particle size of the primary particles contained in the underrecording layer is 1.2 to 10 times the average primary particle size of the primary particles contained in the upperrecording layer.

3. The ink jet recording material as claimed in claim 1, wherein the upperrecording layer further comprises a cationic compound.

4. The ink jet recording material as claimed in claim 1, wherein the ink receiving lavers further comprise an additional recording layer comprising, as a principal component, a polymeric material and is arranged between the support and the underrecording layer.

5. The ink jet recording material as claimed in claim 1, wherein the upperrecording layer is one provided in such a manner that a coating layer corresponding to the upperrecording layer is formed on a casting surface; a underrecording layer formed on a support is superposed on and bonded to the coating layer located on the casting surface, and the resultant laminate is separated from the casting surface.

6. The ink jet recording material as claimed in claim 1, wherein the upperrecording layer is one provided in such a manner that a first coating layer corresponding to the upperrecording layer is formed on a casting surface; a second coating layer corresponding to the underrecording layer is formed on the first coating layer; a support is superposed on and bonded to the second coating layer; and the resultant laminate is separated from the casting surface.

7. The ink jet recording material as claimed in claim 1, wherein the pigment comprises at least one member selected frog the group consisting of amorphous silica and alumina silicate.

8. The ink jet recording material as claimed in claim 1, wherein the pigment comprises amorphous silica.

9. The ink jet recording material as claimed in claim 1, wherein at least one recording layer other than an uppermost recording layer of the ink-receiving layer has cracks formed to such an extent that when an ink jet dot printing is applied to the crack-formed recording layer, and the printed ink dots having a diameter of 50 $\mu$m are observed through an optical microscope at a magnification of 150, a crack proportion which is represented by a ratio in % of the number of the printed dots in which cracks are formed to the total number of the printed dots, is 30% or more.

10. The ink jet recording material as claimed in claim 9, wherein the uppermost recording layer has a crack proportion smaller than that of the other recording layers.

11. The ink jet recording material as claimed in claim 9, wherein the uppermost recording layer has a pore volume of 0.2 to 3.0 ml/g.

12. The ink jet recording material as claimed in claim 9, wherein at least the uppermost recording layer is one formed on a casting surface, integrated with the remaining recording layers, of which at least one layer has cracks, and the support, and is then separated from the casting surface.

13. The ink jet recording material as claimed in claim 9, produced by a procedure in which at least one recording layer other than the uppermost recording layer is formed on a surface of a support and dried; during the formation of the other recording layer, at least one surface of the at least one other recording layer is wetted with water or a solvent; and then the uppermost recording layer is coated on the at least one other recording layer and dried.

14. The ink jet recording material as claimed in claim 1, wherein the average secondary particle size of the secondary particles of the pigment is 10 to 300 nm.

15. A process for producing an ink jet recording material comprising a plurality ink receiving layers comprising at least one underrecording layer formed on the support and at least one upperrecording layer formed on the underrecording layer, the under and upper-recording layers comprising secondary particles of a pigment having an average secondary particle size of 10 to 400 nm and each consisting essentially of a plurality of primary particles agglomerated with each other and having an average primary particle size of 3 to 40 nm, and the average primary particle size of the primary particles contained in the underrecording layer is larger than the average primary particle size of the primary particles contained in the upperrecording layer, in which process at least one first coating layer corresponding to the at least one upperrecording layer is formed on a casting surface; separately at least one second coating layer corresponding to the at least one underrecording layer is formed on a surface of a support; the second coating layer-coated support is laminated on the first coating layer formed on the casting surface in such a manner that the surface of the second coating layer is brought into contact with and bonded to the surface of the first coating layer; and the resultant laminate is separated from the casting surface.

16. A process for producing an ink jet recording material comprising a support and a plurality of ink receiving layers comprising at least one underrecording layer formed on the support and at least one upperrecording layer formed on the underrecording layer, the under and upper-recording layers comprising secondary particles of a pigment having an average secondary particle size of 10 to 400 nm and each consisting essentially of a plurality of primary particles agglomerated with each other and having an average primary particle size of 3 to 40 nm, and the average primary particle size of the primary particles contained in the underrecording layer is larger than the average primary particle size of the primary particles contained in the upperrecording layer, in which process, at least one first coating layer corresponding to the at least one upperrecording layer is formed on a casting surface; at least one second coating layer corresponding to the at least one underrecording layer is formed on the first coating layer; a support is laminated on the first and second coating layers formed on the casting surface; and the resultant laminate is separated from the casting surface.

17. A process for producing an ink jet recording material comprising;

forming at least one dried coating layer containing a binder and secondary particles of a pigment having an average secondary particle size of 10 to 400 nm and each consisting essentially of a plurality of primary particles agglomerated with each other and having an average primary particle size of 3 to 40 nm, on a casting surface;

separately forming at least one coating layer containing a binder and secondary particles of a pigment having an average secondary particle size of 10 to 400 nm and each consisting essentially of a plurality of primary particles agglomerated with each other and having an average primary particles size of 3 to 40 nm and larger than the average primary particle size of the primary particles contained in the dried coating layer located on the casting surface, on a surface of a support;

laminating, while the surface of the coating layer formed on the support is kept in a wetted condition, the coating layer-coated support on the dried coating layer formed on the casting surface in such a manner that the wetted coating liquid layer surface on the support is brought into contact with and bonded to the dried coating layer on the casting surface;

and separating the resultant laminate from the casting surface.

18. A process for producing an ink jet recording material comprising;

forming at least one dried coating layer containing a binder and secondary particles of a pigment having an average secondary particle size of 10 to 400 nm and each consisting essentially of a plurality of primary particles agglomerated with each other and having an average primary particle size of 3 to 40 nm, on a casting surface;

forming at least one coating layer containing a binder and secondary particles of a pigment having an average secondary particle size of 10 to 400 nm and each consisting essentially of a plurality of primary particles agglomerated with each other and having an average primary particles size of 3 to 40 nm and larger than the average primary particle size of the primary particles contained in the dried coating layer located on the casting surface, on a surface of the dried coating layer;

laminating, while the surface of the coating layer formed on the dried coating layer is kept in a wetted condition, a support on the wetted coating layer formed on the dried coating layer in such a manner that the wetted coating liquid layer surface on the support is brought into contact with and bonded to the wetted coating layer;

and separating the resultant laminate from the casting surface.

19. The process as claimed in claim 15, 16, 17 or 18, wherein the average secondary particle size of the secondary particles of the pigment is 10 to 300 nm.

* * * * *